United States Patent [19]

Dahlen et al.

[11] Patent Number: 5,822,562
[45] Date of Patent: Oct. 13, 1998

[54] METHOD AND APPARATUS FOR EXPANSION, CONTRACTION, AND REAPPORTIONMENT OF STRUCTURED EXTERNAL STORAGE STRUCTURES

[75] Inventors: Dennis James Dahlen, Rhinebeck; David Arlen Elko; Audrey Ann Helffrich, both of Poughkeepsie; Richard Pervin King, Thornwood; Jeffrey Mark Nick, Fishkill; Stewart Laundon Palmer, Yorktown Heights; Wendell Wiley Wilkinson, Hyde Park, all of N.Y.

[73] Assignee: International Business Machines Corporation, Armonk, N.Y.

[21] Appl. No.: 590,003

[22] Filed: Jan. 23, 1996

Related U.S. Application Data

[62] Division of Ser. No. 304,458, Sep. 12, 1994, Pat. No. 5,581,737.

[51] Int. Cl.[6] .................................................. G06F 12/02
[52] U.S. Cl. ..................................... 395/497.01; 395/670
[58] Field of Search .................................. 395/600, 477, 395/182.03, 700, 497.01, 497.02, 497.03

[56] References Cited

U.S. PATENT DOCUMENTS

| | | | |
|---|---|---|---|
| 5,388,266 | 2/1995 | Frey et al. | 395/700 |
| 5,394,542 | 2/1995 | Frey et al. | 395/575 |
| 5,457,793 | 10/1995 | Elko et al. | 395/600 |
| 5,515,499 | 5/1996 | Allen et al. | 395/182.03 |
| 5,537,573 | 7/1996 | Ware et al. | 395/464 |
| 5,537,635 | 7/1996 | Douglas | 395/456 |
| 5,544,345 | 8/1996 | Carpenter et al. | 395/477 |
| 5,561,809 | 10/1996 | Elko et al. | 395/800 |
| 5,581,737 | 12/1996 | Dahlen et al. | 395/497.01 |

*Primary Examiner*—Thomas G. Black
*Assistant Examiner*—Jean M. Corrielus
*Attorney, Agent, or Firm*—Floyd A. Gonzalez

[57] ABSTRACT

A method and apparatus for optimizing a data structure of an external data storage facility shared by a plurality of data processing systems, the data structure being allocated by a first allocation command which includes first allocation parameters based on an amount of storage space in the external data storage facility assigned for creation of the data structure and a composition of the data structure, includes a device for determining values of the first allocation parameters, to thereby determine a first composition of the data structure, a device for determining an actual usage of the data structure, to thereby determine a second composition of the data structure, a device for comparing the first composition of the data structure with the second composition of the data structure, and a device for issuing, based on an output from the comparing device, a second allocation command having second allocation parameters, to the data structure for reallocation thereof. The issuing device includes a device for adjusting the first composition of the data structure to the second composition, as storage space in the external data storage facility and processing cycles become available to execute the second allocation parameters. Until the second allocation parameters are achieved, the reallocation of the data structure remains pending and all processing commands are accepted and processed by the external data storage facility.

1 Claim, 13 Drawing Sheets

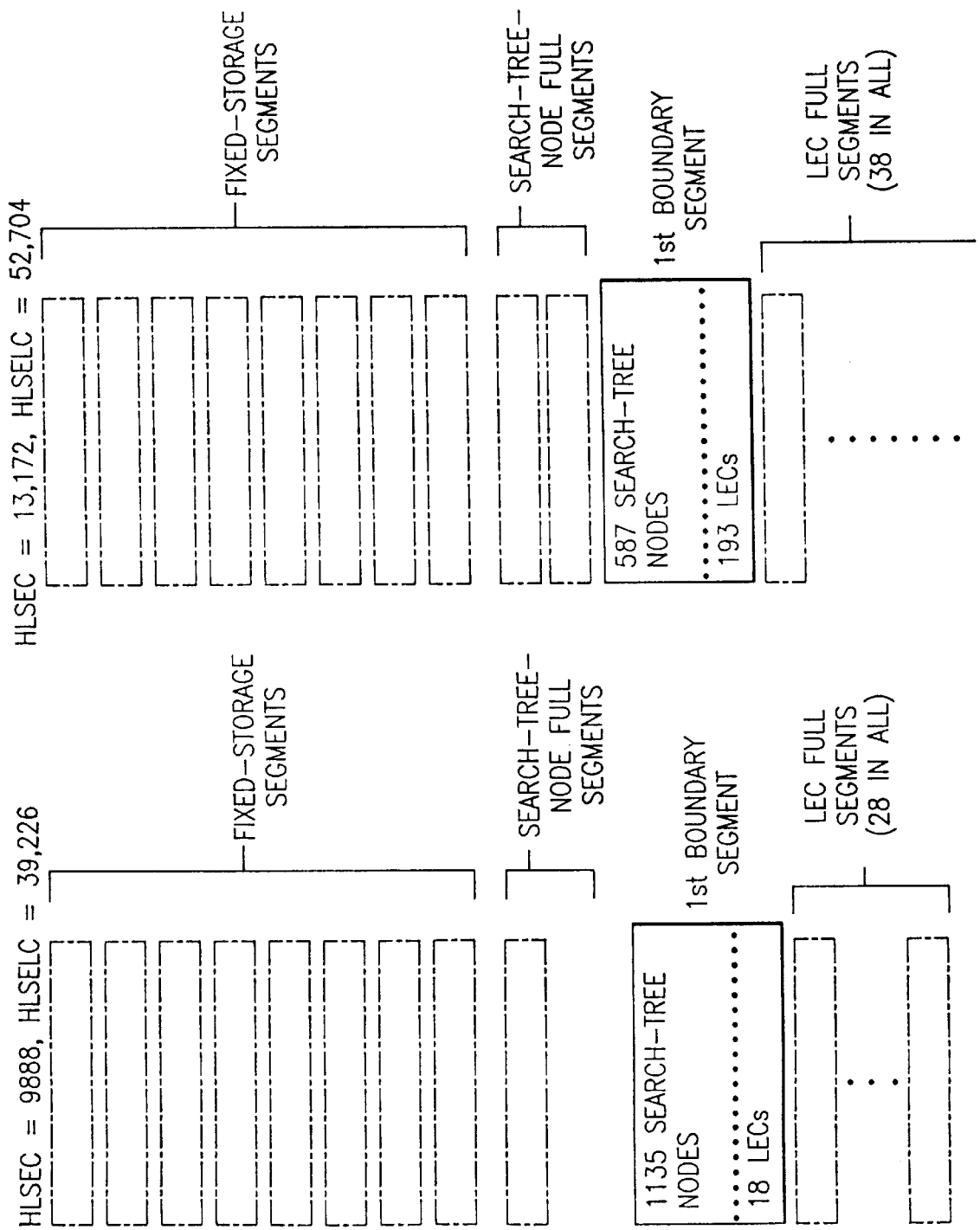

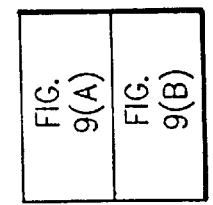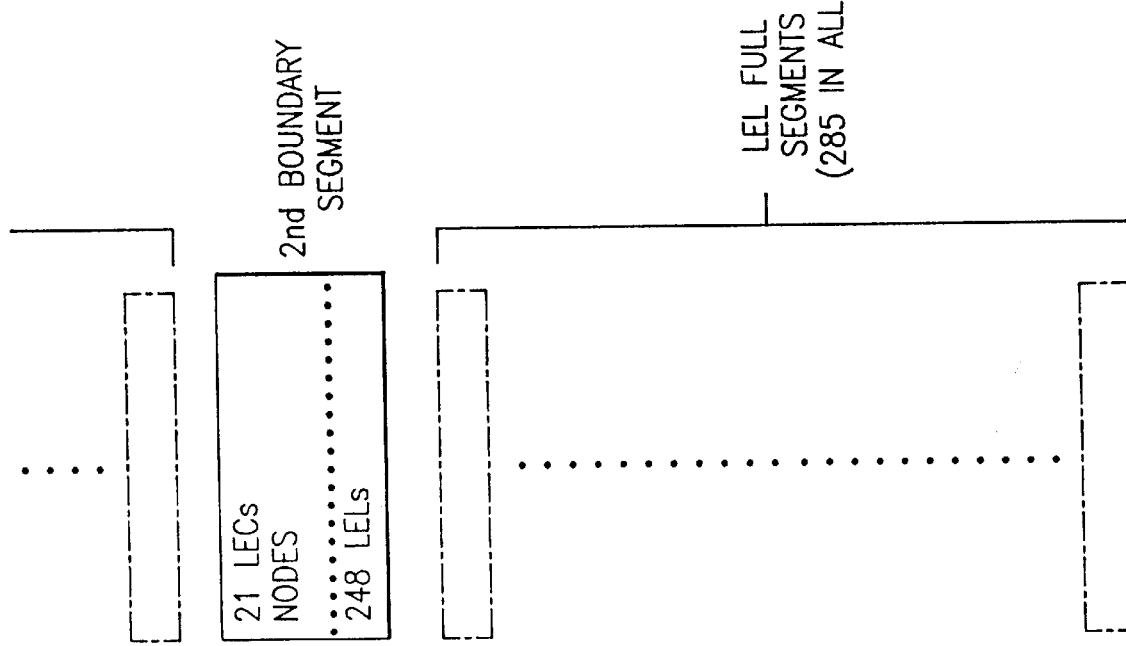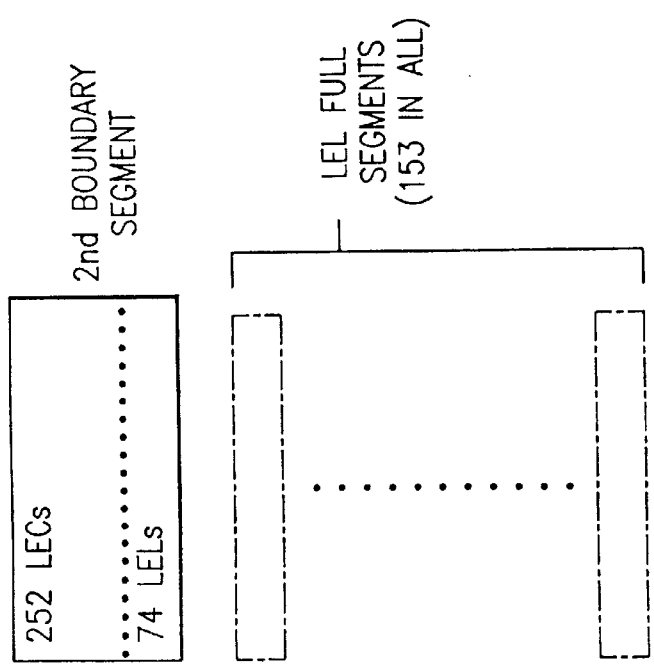

METHOD AND APPARATUS FOR EXPANSION, CONTRACTION, AND REAPPORTIONMENT OF STRUCTURED EXTERNAL STORAGE STRUCTURES

This application is a division of application Ser. No. 08/304,458 filed Sep. 12, 1994 now U.S. Pat. No. 5,581,737.

CROSS REFERENCE TO RELATED APPLICATIONS

This application contains subject matter which is related to the subject matter of U.S. Pat. No. 5,561,809 issued Oct. 1, 1996 for "In a Multiprocessing System having a Coupling Facility, Communicating Messages Between the Processors and the Coupling Facility in either a Synchronous Operation or an Asynchronous Operation", a continuation of U.S. patent application Ser. No. 07/860,380, filed on Mar. 30, 1992, now abandoned; U.S. Pat. No. 5,537,574 issued Jul. 16, 1996 for "Sysplex Shared Data Coherency Method and Means"; U.S. Pat. No. 5,339,405 issued Aug. 16, 1994 for "Command Quiesce Function"; U.S. Pat. No. 5,457,793 issued Oct. 10, 1995 for "Software Cache Management of a Shared Electronic Store in a Sysplex"; U.S. Pat. No. 5,493,668 issued Feb. 20, 1996 for Multiple Processor System having Software for Selecting Shared Cache Entries of an Associated Castout Class for Transfer to a DASD With One I/O Operation"; U.S. Pat. No. 5,392,397 issued Feb. 21, 1995 for "Command Execution System for Using First and Second Commands to Reserve and Store Second Command Related Status Information in Memory Portion Respectively"; U.S. Pat. No. 5,331,673 issued Jul. 19, 1994 for "Integrity of Data Objects Used to Maintain State Information for Shared Data at a Local Complex"; U.S. Pat. No. 5,463,736 issued Oct. 31, 1995 for "Coupling Facility for receiving Commands from Plurality of Host for Activating Selected Connection Paths to I/O Devices and Maintaining Status Thereof" a continuation of U.S. patent application Ser. No. 07/860,646 filed on Mar. 30, 1992, now abandoned; U.S. pat. application Ser. No. 08/383,532, filed on Feb. 1, 1995, a continuation of U.S. patent application Ser. No. 07/860,655, filed on Mar. 30, 1992, entitled "Method and Apparatus for Performing Conditional Operations on Externally Shared Data" corresponding to IBM Docket No. PO9-92-008, now abandoned; U.S. Pat. No. 5,317,739 issued May 31, 1994 for "Method and Apparatus for Coupling Data Processing Systems"; and U.S. Pat. No. 5,450,590 issued Sep. 12, 1995 for "Authorization Method for Conditional Command Execution, a continuation of U.S. patent application Ser. No. 08/021,285, filed on Feb. 22, 1993, now abandoned; which are assigned to the assignee of this application and which are hereby incorporated by reference.

BACKGROUND OF THE INVENTION

1. Field of the Invention

The present invention generally relates to a method and apparatus for use in a cache storage system for a structured external storage (SES) facility. More particularly, the invention relates to a method and apparatus for reissuing an allocate command to an already existing structure (e.g., cache or list), and for assigning new allocation parameters thereto to expand, contract or reapportion the structure, as storage resources become available in the SES facility and as processor cycles become available to execute the changes.

2. Description of the Related Art

An SES facility is used for coupling data processing systems together and is a repository for shared data objects (e.g., Cache objects and List objects). The SES has a processing capacity which allows it to independently process commands, or messages, received from sharing systems through a defined message protocol. Each of the sharing systems has a SES Support Facility which permits it to receive notifications from the SES without interruption of mainline processing within the processor (e.g., the host processor) on which the sharing system is operating. In processing these commands, the SES may generate messages to the command-sending system, or to other systems. In the SES, a command serialization mechanism permits the parallel execution of multiple commands, while preserving the integrity of data objects. The SES is capable of independent command execution and of storing and operating on at least two different types of shared data objects in response to commands from sharing systems. Further, the support facility at each sharing processor is capable of interacting with and receiving notice from a shared coupling device containing a plurality of distinct data object types.

A cache structure or list structure is created in the SES facility when the operating system issues an allocate-cache-structure or allocate-list-structure command. The amount of SES storage assigned to the structure for the creation of the directory entries and data elements, and the relative numbers of each is specified via request operands associated with the allocate command and are referred to as "allocation parameters". However, the values of the allocation parameters are estimates based on expected structure usage, and may deviate from the actual usage. Moreover, usage is a direct function of workload, thereby changing dynamically in the short term and growing beyond the bounds of the storage structure in the long term.

A problem encountered by conventional systems is adjusting the allocation parameters to optimally fit the actual usage. A conventional solution has been to deallocate the cache (or list) structure and to reallocate it with new values for the allocation parameters. However, this technique has several serious drawbacks.

First, service provided by the cache (or list) structure is disrupted for the duration of the deallocate and subsequent allocate operations. Secondly, the requested storage resources may not be available to satisfy the allocation request. For example, the storage may have been assigned to a second cache (or list) structure in the interval between the deallocate and the allocate operations or, alternatively, the storage may not have been ever available.

SUMMARY OF THE INVENTION

It is therefore an object of the present invention to provide a method and apparatus for allowing a data structure (e.g., cache or list) to be contracted, expanded or reapportioned without having to disrupt service provided by the cache or list structure for the duration of deallocate and subsequent allocate operations, and for ensuring that the storage resources that are requested are available to satisfy the allocation request (e.g., Allocate-Cache-Structure, Allocate-List-Structure).

According to a first aspect of the invention, an apparatus is provided for optimizing a data structure of an external data storage facility shared by a plurality of data processing systems, the data structure being allocated by a first allocation command, the first allocation command including first allocation parameters based on an amount of storage space in the external data storage facility assigned for creation of the data structure. The apparatus includes:

means for determining values of the first allocation parameters, to thereby determine a first composition of the data structure;

means for determining an actual usage of the data structure, to thereby determine a second composition of the data structure;

means for comparing the first composition of the data structure with the second composition of the data structure; and means for issuing, based on an output from the comparing means, a second allocation command having second allocation parameters, to the data structure for reallocation thereof, the issuing means including means for adjusting the first composition of the data structure to the second composition, as storage space in the external data storage facility and processing cycles become available to execute the second allocation parameters, wherein, until the second allocation parameters are achieved, the reallocation of the data structure may remain pending and all processing commands are accepted and processed by the external data storage facility.

Thus, the invention provides a method and apparatus for redistributing structure resources once an initiative for triggering resource re-distribution has been provided. The redistribution is in accordance with program-specified goals rather than mandated by an internal control unit function and the resources are redistributed and addressable by an attached program, and thus the structure resources are redistributed while still in use by host programs. The assignment of additional storage or release of storage does not affect ongoing operations of programs against the objects in the structure which remain in use across the physical storage redistribution. Commands executed against objects in the structure continue to execute concurrently with the dynamic redistribution of structure resources. Additionally, the invention provides program-directed dynamic reapportionment of resources between directory and data elements in use by host programs.

Directory entry resources may be converted to data element resources and conversely data elements may be converted to directory entry resources, as required. More specifically, the storage model for SES allows the total storage available to exceed the addressing range of instructions that can address individual bytes of storage; i.e., the byte-addressable storage. An example is when the processing element is limited to 32-bit addresses, thereby limiting the byte-addressable storage to 4 gigabytes, however more than 4 gigabytes is installed. In this case, the directory entry resources must reside in the lower 4-gigabyte range. Data objects may reside either in this range or outside of it. Thus, data elements may be converted to directory-entry resources provided they reside within the byte-addressable region. This is referred to as the "control storage".

The SES structure can be expanded, contracted or reapportioned, with the SES structure being fully available for command execution. The storage model of the SES structure according to the present invention maintains a prescribed relationship between data storage and control storage. Expansion or contraction requests are specified by target sizes and target ratios. The invention is unique and novel in its application to pending expands or contracts of the SES structure storage. Further, expansion and contraction are not performed in a fixed state, but in an optimal state in which the amount of change is determined by each invocation of the expansion, contraction and reapportionment process. A cache or list structure may be expanded in size, contracted in size, or the relative number of directory entries and data elements may be altered (i.e., reapportioned) in a "reapportionment" operation. Further, the invention includes means for determining the progress of the new allocation of the program, means for terminating the progress of the new allocation and means for altering the targets.

Thus, the new parameters need not necessarily be acted upon immediately by the SES facility. Until the targets are achieved, the allocation process may remain pending and the process is continuous. During this time, all commands are accepted by the SES facility and processed without delay. Hence, there is no break in service as in the conventional systems.

BRIEF DESCRIPTION OF THE DRAWINGS

The foregoing and other objects, aspects and advantages will be better understood from the following detailed description of a preferred embodiment of the invention with reference to the drawings, in which:

FIGS. 9(a)–9(b), joined as shown in FIG. 9, illustrate boundary-segment reorganization for a list-structure.

DETAILED DESCRIPTION OF A PREFERRED EMBODIMENT OF THE INVENTION

Figure 1:
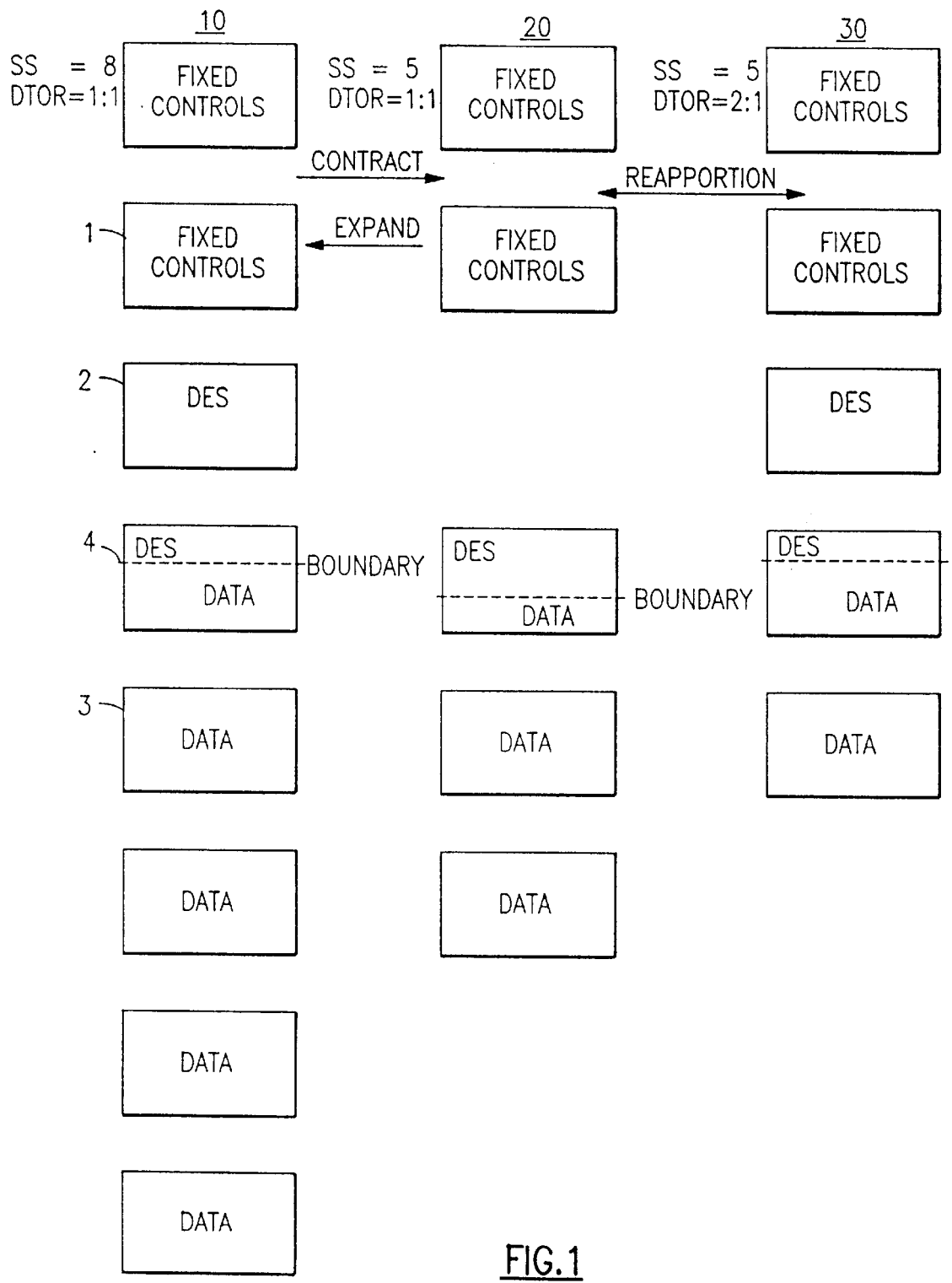
FIG. 1 illustrates a cache structure geometry.

Referring now to the drawings, and more particularly to FIG. 1, there is shown a cache structure geometry including structures 10, 20 and 30. All storage for a cache structure is made up of a plurality of fixed size storage segments including fixed control segments, data storage segments, directory entry storage segments and boundary storage segments.

Fixed control segments 1 contain the fixed controls of a cache structure. These segments remain unchanged throughout the life of the cache structure (i.e., throughout expansion, contraction and reapportionment).

Directory entry (DE) storage segments 2 contain the cache directory and as such contain only directory entries. The size of a directory entry is fixed and is established when the structure is initially created. However, the number of directory entries, and hence the number of directory entry segments may change due to expansion, contraction, or reapportionment.

Data storage segments 3 contain only data elements. The size of a data element is fixed and is established when the structure is initially created. However, the number of data elements, and hence the number of data storage segments, may change due to expansion, contraction, or reapportionment.

Boundary storage segments 4 may contain both directory entries and data elements. All directory entries in this segment are contiguous, as are all the data elements (as shown in FIG. 1). The boundary is the location in a boundary segment which separates the directory entries and data elements, and divides the storage so that the requested Target Directory-to-Data Ratio (TDTDR) is met. There is only one boundary segment in a cache structure.

It is noted that the data structure may contain at least one data object and a directory which may include at least one directory element respectively locating the at least one data object. However, a cache structure can be created with no data objects and is a useful and expected situation. If the cache has no data, it is referred to as a "directory-only cache" and is used for maintaining local cache coherency. It is also possible to create a cache structure with some data objects, then reapportion the cache to have no data objects at all. This differs slightly from the directory-only cache in that the cache may be reapportioned a second time to recreate the data objects. Such an operation cannot be performed with the directory-only cache.

Further, it is noted that the directory and data objects are not necessarily bound at allocation. Indeed, they are treated as storage resources only. The binding of data to directory occurs when a write command is executed and the data did not previously exist in the structure. Additionally, the assignment of a directory object occurs separately from the assignment and binding of a data object. It may likely be the case that numerous directory objects have no associated data object even though the data objects exist as storage resources. Thus, binding does not occur until the write command occurs.

As shown in FIG. 1, the illustration of the three cache structures shows how structure 10 is contracted to structure 20, and how structure 20 is reapportioned to structure 30. FIG. 1 can also be viewed as structure 30 being reapportioned to structure 20 and structure 20 being expanded to structure 10.

An overall system configuration of a SES facility is constructed in accordance with those disclosed, for example, in the aforementioned U.S. Pat. No. 5,463,736 issued Oct. 31, 1995 for "Coupling Facility for Receiving Commands from Plurality of Hosts for Activating Selected Connection Paths to I/O Devices and Maintaining Status Thereof" and the aforementioned U.S. Pat. No. 5,317,739 issued May 31, 1994 for "Method and Apparatus for Coupling Data Processing Systems", which are assigned to the assignee of this application and which are hereby incorporated by reference.

Thus, a detailed description of the system will not be given hereunder, but only so much as to provide a context for the present invention.

Figure 2:
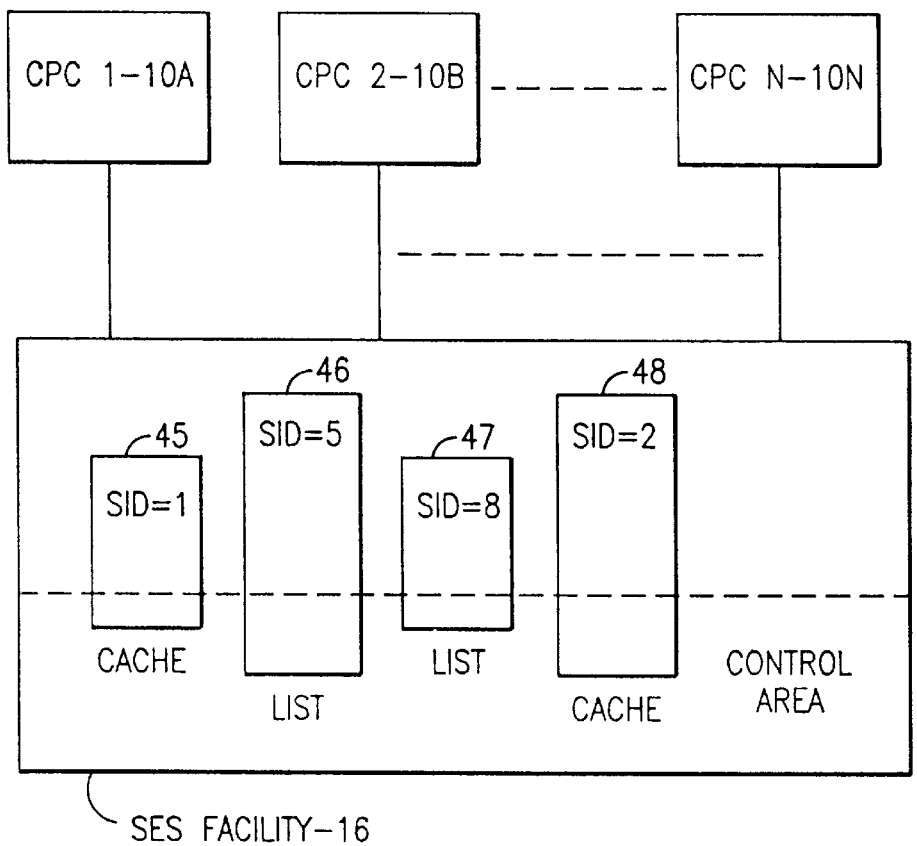
FIG. 2 illustrates multiple structures in a SES facility to include cache and list structures.
Figure 3:
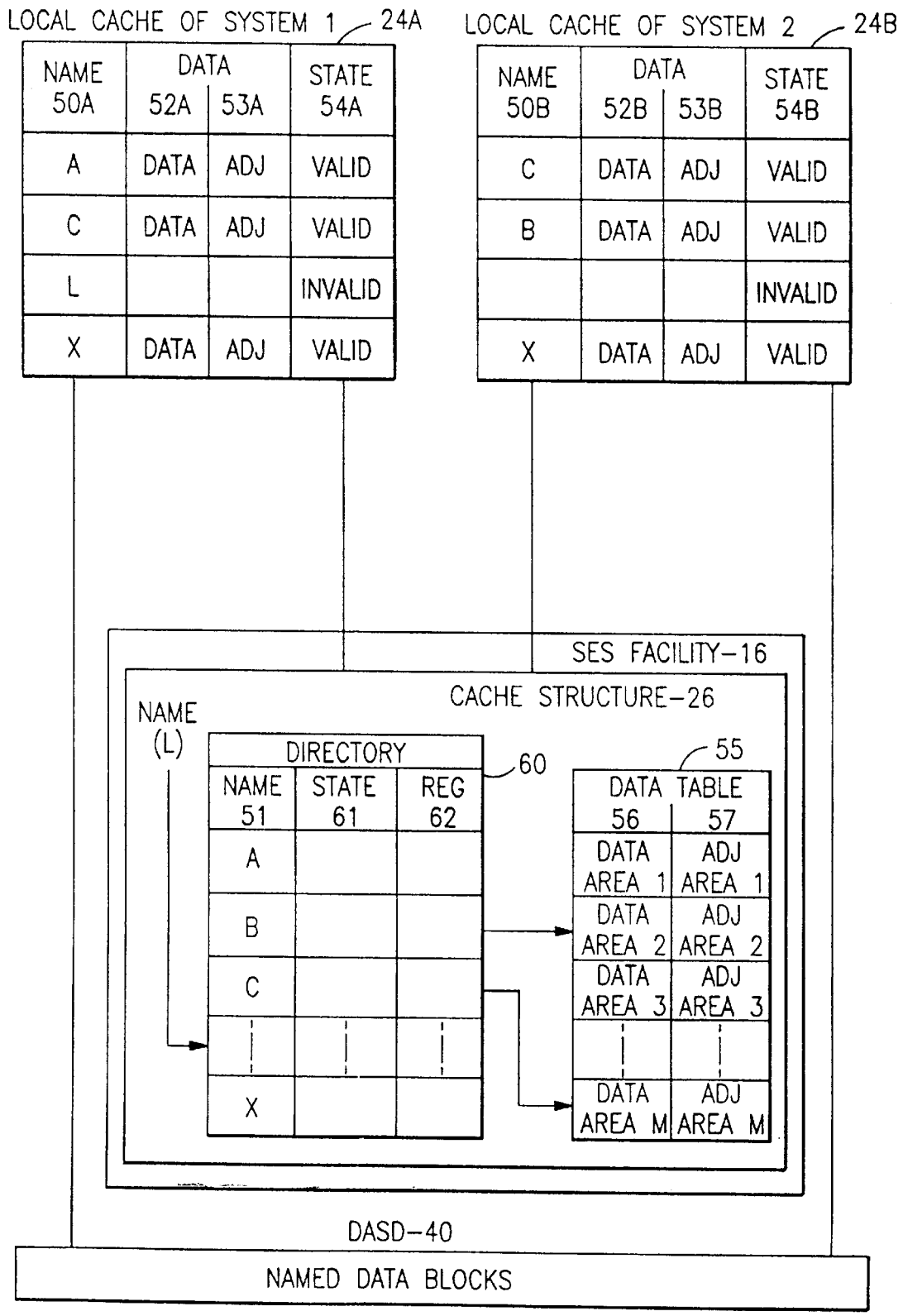
FIG. 3 illustrates the three-level storage hierarchy of a data processing system which includes a SES facility to include a cache structure.

Briefly, in those systems and as shown in FIG. 2, a plurality of central processing complexes (CPCS) 10A–10N are connected to an SES facility 16, which contains storage accessible by the CPCs and which performs operations requested by programs in the CPCs. Multiple SES facilities may be provided for, each with its own I/S channels and message paths connected to all or some subset of the CPCs 10A–10N. As shown in FIG. 3, each of the CPCs 10A–10N has a local cache 24A–24N, respectively, and the SES facility 16 contains one or more SES caches 26. The Direct Access Storage devices (DASD) 40, the local caches 24A–24N and the SES cache 26 form a three-level storage hierarchy. The lowest level of storage is the DASD 40, the intermediate level of storage is the SES cache 26, and the highest level is the local caches 24A–24N. The DASD 40 and SES cache 26 are shared by the processors 10A–10N and are accessed by I/O operations and message operations, respectively. A local cache 24 is defined in each processor 10 and is accessed using CPU instructions.

Each of the CPCs 10A–10N may be an International Business Machines, Inc. (IBM) system following the Enterprise Systems Architecture/390 Principles of Operation as described in IBM publication SA22-7201-00, incorporated herein by reference, or another like system. Each of the CPCs 10A–10N includes one or more central processing units (CPUs) which executes an operating system, such as IBM's MVS operation system or the like, for controlling execution of programs for processing data, as is well known. One such program performs the bulk of the SES operations mentioned herein and is referred to herein as "the program". It is noted that while the present invention is described hereunder in the context of the IBM architecture and operating system mentioned above, the present invention is not limited to such an architecture and system and can be tailored for operation on other systems.

As shown in FIG. 2, the SES facility 16 has multiple structures (e.g., cache and list) 45–48. The SES facility provides the program with separate storage structures. Among these are the list structure (e.g., 46, 47) and cache structure (e.g., 45, 48). A set of commands is provided for each structure type, as well as additional commands for referencing global objects, as discussed below. The creation, deletion and attributes of a particular structure are controlled by the program through allocation and deallocation commands. The allocated structures 45–48, which may be of the same type and exist concurrently, reside in separate SES storage locations and are located by a structure identifier (SID). The SID value provides an identification of a target structure by a command. A command of a particular structure type, such as a cache-structure or list-structure command, addresses or alters only the contents of a single structure of the given type.

Figure 4:
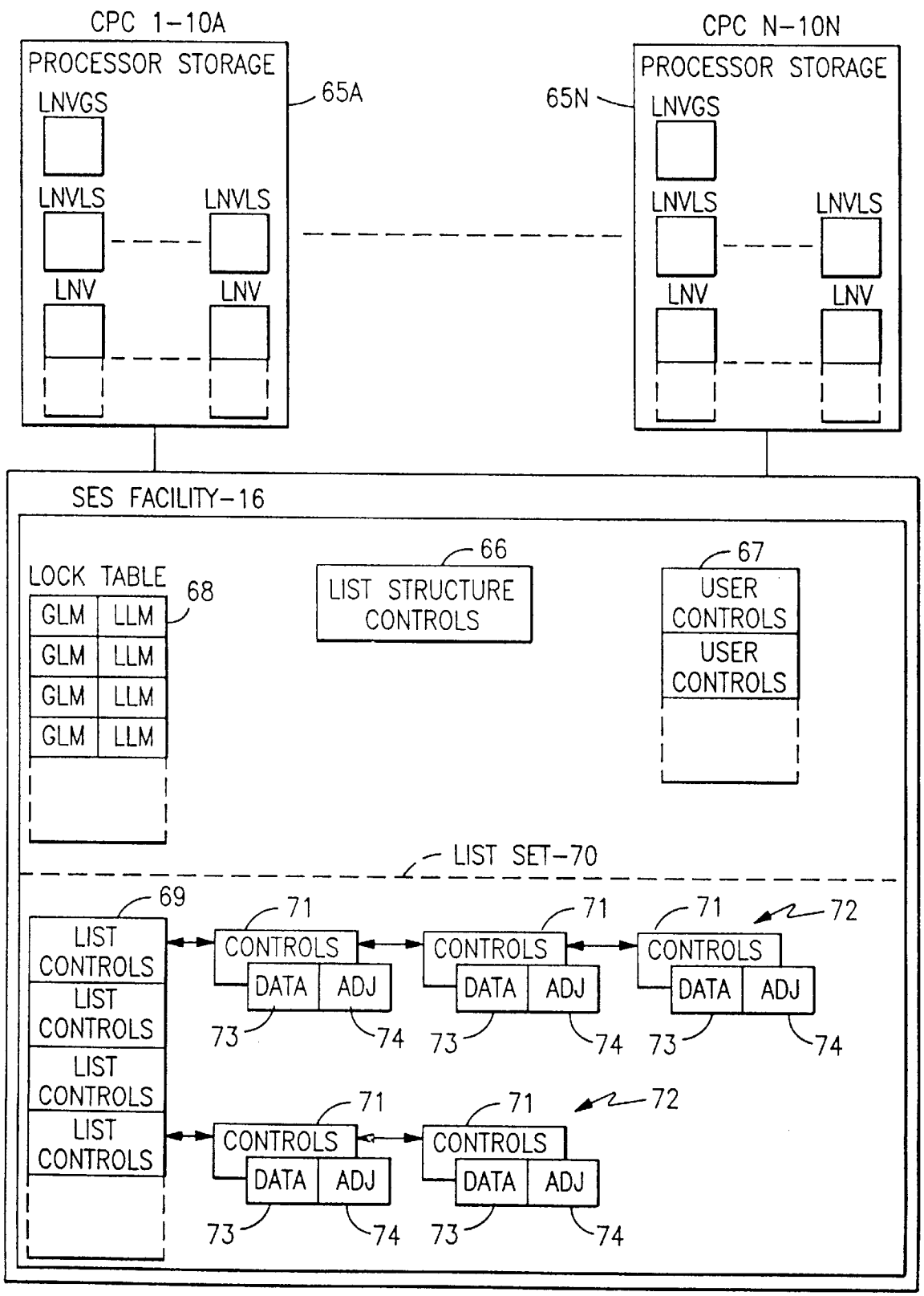
FIG. 4 illustrates one of the list structures of the structures shown in FIG. 2.

SES storage contains data objects and control objects. The data objects may reside in any storage location, whereas the control objects are generally restricted to the control area. The partitioning of the SES storage and control area into structures as shown in FIGS. 2, 3 and 4 is managed by the program. The data objects are organized in tables or lists with an optional adjunct data area. The remaining objects are controls. The relative amounts of storage assigned to data and control objects are determined by program-specified parameters in the allocation commands.

Referring to FIG. 3, data that moves through the storage hierarchy is given a name (columns 50A and 50B in the local caches 24A and 24B respectively, and column 51 in the SES cache 26). Data areas in the local caches 24A, 24B are shown in columns 52A, 52B, respectively, and optional adjunct data areas in the local caches 24A, 24B are shown in columns 53A, 53B, respectively. Each entry in the local caches 24A, 24B includes a state indicator shown in columns 54A, 54B, respectively. Each SES cache 26 may include a data table 55 which includes data areas (column 56) and adjunct data areas (column 57). The data sizes are variable with the range of variability being between 1 and "n" times the data-area element size. The data-area element sizes are fixed for each SES cache 26 and are powers of 2 with a minimum size of 256 bytes. An optional field of adjunct data may be associated with the data (columns 53A, 53B and 57). The names of the data (columns 50A, 50B and 51) are 16-byte values assigned by a programming protocol. The data is permanently resident in the DASD storage 40.

Copies or new versions of the data may also reside in any combination of SES-cache storage 26 and/or local-cache storage 24A and 24B. For instance, a data object may reside in SES-cache storage 26 and a subset of local caches 24A–24N, or it may reside in a subset of local caches 24A–24N but not in the SES-cache storage 26.

Each local cache 24A–24N is a processor storage area maintained by the program by utilizing a respective SES-support facility on the CPC containing the local cache vector defined by a DEFINE VECTOR instruction.

Each SES cache structure 26 is a structure in the SES facility 16 consisting of a directory 60 and, optionally, a data table 55 having a collection of data-area elements in columns 56 and 57. The directory 60 includes the name column 51 previously mentioned, and a state column 61 for indicating the state of each directory entry, and a register column 62 for pointing from each entry in the directory 60 to an entry in the data table 55. Each cache structure is designated by a structure identifier SID. Each SES cache structure in the SES cache 26 is created by an allocate-cache-structure command. The command is issued by an initialization procedure within the program which determines the attributes of the SES cache structure to include size and number of data-area elements, number of directory entries, number of storage classes, and number of castout classes.

A local cache 24 is attached to the SES cache 26 by the attach-local-cache command that initializes controls in the SES facility 16 and associates the local cache with a set of paths over which the SES cache 16 issues generated commands to the SES-support facility (unillustrated). A local cache 24 is attached to a SES cache structure 26 so that it may participate in the storage hierarchy. Coherency of copies of the data in the local caches 24A–24N and the SES cache 26 is maintained by controls in the SES cache 26 and enforced by cross-invalidate commands issued as generated commands to the various SES-support facilities in their respective CPCs 10A–10N.

The directory 60 is a collection of directory entries arranged as a fully associative array. The directory entries are partitioned into storage classes. The subset of changed directory entries is partitioned into castout classes. Whenever a named data object is placed in the higher two levels of the hierarchy (SES cache 26 and local cache 24), its state is registered in the state column 61 and its location is registered in the register column 62 by the SES-cache directory. State information indicates whether the data is changed, unchanged, or locked for castout, or resident in the SES-cache storage 26. Location information includes which of the local caches 24A–24N contains a copy. Certain SES-read and SES-write commands register the local-cache copy in the SES-cache directory. SES-write and SES-invalidate commands remove the registration and invalidate local copies.

When the data is located in the local cache 24, the state of the data is either valid or invalid. The valid state of local cache entries is maintained by controls in an SES-support facility (unillustrated). The data is validated by CPU instructions and invalidated by SES-write and SES-invalidate operations. The valid state of the data is tested by a CPU instruction. A valid named data object must be registered in the SES-cache directory 60 to maintain local cache coherency. Local-cache coherency is maintained by the invalidation process. A registered local-cache entry may test as invalid.

The SES-cache storage 55 is normally smaller than the DASD storage 40. Thus, the changed data must periodically be transferred (i.e., "castout") from the SES cache 26 to the backing DASD 40. Castout is controlled by the program and involves issuing a SES-read command for castout operation that sets the castout serialization and copies the data block to main storage which may or may not be put in the local cache 24. An I/O operation is executed that copies the data block to DASD 40. A SES unlock castout locks operation is issued that releases the castout serialization. Multiple castout processes may coexist for a single one of the local caches 24A–24N. Whenever data is locked for castout, an identifier for the local cache 24A–24N and an identifier for the castout process are placed in the directory 60.

The least recently used (LRU) unchanged data and directory resources are reclaimed by the SES cache 26 when needed to meet new requests. The data objects are mapped into one of several storage classes by the program. Each storage class has a reclaiming vector that controls the reclaiming process. This allows the allotment of SES storage among the storage classes to be dynamically adjusted to account for changes in workload characteristics. The reclaiming vector is maintained by the program.

FIG. 4 shows the connection of CPCs 10A–10N to the SES facility 16 wherein each CPC 10A–10N includes processor storage 65A–65N, respectively. The contents of one list structure 46 are shown in FIG. 4. It will be understood that the other list structures of the SES facility would be the same as the list structure shown in FIG. 4.

The list structure 46 comprises list-structure controls 66, user controls 67, and, optionally, a lock table 68, and/or a list set 70 with list controls 69 and list-entry controls 71. Each lock table 68 consists of a sequence of one or more entries, which are consecutively numbered starting at zero. The list-structure type determines whether all the lock-table entries have a global-lock-manager (GLM) object, a local-lock-manager (LLM) object, or both.

The list-structure controls 66 are initialized when the list structure 46 is created. The list-structure controls 66 contain attributes of the structure, such as the structure size, list-structure type, lock-table-entry count, nonzero-lock-table-entry count, lock-table-entry size, list count, list-element size, the list-set-entry count, user-identifier vector and user controls, shown separately at 67.

The user controls 67 are created and initialized when the list-structure user is attached. The user controls 67 contain a list-notification token, system identifier, user-attachment control, and user state.

The list controls 69 contain a list-entry count, a list-element count, either a list-entry-count limit or a list-element count limit, a list-monitor table, a list-state-transition count, and a user list control. Each list 72 consists of a sequence of zero or more entries. The list-structure type determines whether the list structure 70 contains data list entries 73, adjunct list entries 74, or both. If the list structure contains adjunct list entries, then there is exactly one adjunct list entry associated with each list entry. If the list structure contains data list entries, then there may or may not be one or more data list entries associated with a given list entry.

One of the mentioned list-entry controls 71 is associated with each entry of a list 72. The controls 71 contain list-entry-location information and other information for managing the data in the adjunct area 74. The list commands provide a means for writing a lock-table entry. A command may compare global-lock managers and conditionally replace a global-lock manager, a local-lock manager, or both the global-lock and local-lock managers. The list commands also provide a means for reading an entry in the lock-table 68 or the next nonzero lock-table entry, or for clearing a lock table 68.

The list commands also provide a means for conditionally creating, reading, replacing, moving, or deleting one entry in a list 72. A number of comparisons may be requested during these processes. They include a list-number comparison, a version-number comparison, a global-lock-manager GLM comparison, or any combination of the preceding. Additionally, when global locks are compared, local locks LLM may be compared. A list entry may be moved from one list 72 to another within the same structure 46 or from one position to another within the same list 72.

The position of a list entry in a list 72 is determined when it is created, and may be changed when any entry in the list is created, deleted or moved. A list entry or list-entry position is located within a list set 70 by a list-entry identifier, an optional list-entry name, an optional list cursor, or by position. The list-entry identifier is unique to a list set 70 and is assigned by the SES facility 16. The list-entry name is unique to a list set 70 at any particular instant and is provided by the program. The position is specified by means of a list number, a direction, and an optional list-entry key.

When list-entry keys exist, the keyed list entries are ordered by key with the lowest numerical key at the leftmost position. Elements with the same key value may be located by first or last within the same key value. When an unkeyed list entry is created or moved, the target list-entry position is always located by unkeyed position. When a keyed list entry is created or moved, the target list-entry position is always located by keyed position and first or last within the same key value.

The list commands also provide a means for synchronously writing and moving, moving and reading, or reading and deleting one entry of a list 72. More than one list entry may be deleted synchronously, and more than one data list entry 73 or adjunct list entry 74 may also be read synchronously. The data list entry 73 is always returned in the data area designated in main storage by the message-operation block. The adjunct list entry is returned in either the message-response block or the data area, depending on the command. Normally, a data list entry 73 contains application-program data, and an adjunct list entry 74 contains the control data associated with it.

List monitoring is a SES list function which is optionally requested by a list-structure user by the attach-list-structure-user and the register-list-monitor commands. The attach-list-structure-user command identifies to the SES the system on which the list-structure user resides and the list-notification vector (LNV) associated with the user. The register-list-monitor command allows the user to begin monitoring a list.

Each processor storage 65A–65N includes a list-notification-vector global summary (LNVGS), multiple list-notification-vector local summary (LNVLS) entries, and multiple list-notification vectors LNVs. The LNV is created by the DEFINE VECTOR instruction. The sizes of the LNVs may vary among different list users. The LNV is attached to the SES list structure 46 by the attach-list-structure-user command. Each entry in an LNV may be associated with a list 72 in the SES list structure 46. List transitions from the empty to non-empty and non-empty to empty states are detected by periodically polling the appropriate entry in the LNV from the CPU. The TEST VECTOR ENTRY instruction is provided for this purpose.

A LNV entry is set to 1 as a result of a list transition to the empty state, and is set to 0 as a result of a list transition to the non-empty state. When a user is monitoring a list, the empty to not-empty and not-empty to empty state transitions of the list result in the SES facility 16 issuing a list notification command to the system which initiated the user attachment.

The list-notification command causes the specified list-notification-vector LNV entry to be updated to reflect the empty or not-empty state of the monitored list 72. The list-notification command may also cause the specified list-notification-vector global summary LNVGS and list-notification-vector local summary LNVLS to be updated to reflect the not-empty state of the monitored list 72.

Cache (or list) controls are provided which are either fixed or program-modifiable. The fixed cache controls are initialized when the cache is allocated and remain unchanged until the cache is deallocated. The program-modifiable cache controls are initialized when the cache is allocated and may be changed by subsequent SES commands.

The fixed cache controls associated with expansion, contraction, and reapportionment are summarized below:

Maximum Castout Class (MCC): An integer that specifies the number of castout classes.

Maximum Storage Class (MSC): An integer that specifies the number of storage classes.

Maximum Structure Size (MXSS): An integer that specifies the maximum number of units of SES storage that can be allocated for the cache.

The program-modifiable cache controls associated with expansion, contraction, and reapportionment are summarized below:

Target Data-Area-Element Count (TGDAEC): An integer that specifies the target for the maximum number of data-area elements that are available for assignment to directory entries in a cache structure.

Target Directory-Entry Count (TGDEC): An integer that specifies the target for the maximum number of possible directory entries in a cache structure.

Target Structure Size (TSS): An integer that specifies the target number of units to be allocated.

Total-Data-Area-Element Count (TDAEC): An integer that specifies the number of data-area elements allocated for the cache.

Total-Directory-Entry Count (TDEC): An integer that specifies the number of directory entries allocated for the cache.

Marginal Structure Size (MRSS): An integer that specifies the minimum number of units of SES storage that can be allocated for the cache, independent of the requested ratio.

Minimum Apportionable Structure Size (MASS): An integer that specifies the minimum number of units of SES storage that can be allocated for the cache and substantially satisfy the requested ratio.

Pending Directory-to-Data Ratio (PDTDR): A field that contains the last requested target directory-to-data ratio on an allocate cache structure command.

Reapportionment-in-Progress Indicator (REIPI): A value that indicates whether a reapportionment process is currently active for the cache structure.

Structure-Size-Change Indicator (SSCI): A value that indicates whether an expansion or a contraction process is currently active for the cache structure.

The value of the target structure size is rounded up to the nearest multiple of a storage segment size before placing it in the target-structure-size object.

The list-structure controls include fixed and program-modifiable list-structure controls. The fixed list-structure controls are initialized when the list structure is created and remain unchanged until it is deallocated. The program-modifiable list-structure controls are initialized when the list structure is created. The program-modifiable control values may be changed by SES commands.

The fixed list-structure controls associated with expansion, contraction, or reapportionment are summarized below:

Maximum Structure Size (MXSS): An integer that specifies the maximum number of units of SES storage that can be allocated for the list.

The program-modifiable list-structure controls associated with expansion, contraction, and reapportionment are summarized below.

List-Set-Element Count (LSELC): An integer that specifies the number of list elements that have been assigned to list entries or retry-data blocks, or both, in the list set.

List-Set-Entry Count (LSEC): An integer that specifies the number of existing list entries in the list set.

Maximum List-Set-Element Count (MLSELC): An integer that specifies the maximum number of list elements that are available for assignment to list entries or retry-data blocks, or both, in the list set.

Maximum List-Set-Entry Count (MLSEC): An integer that specifies the maximum number of possible list entries in a list set.

Target Maximum-Element Count (TMELC): An integer that specifies the target for the maximum number of list elements that are available for assignment to list entries or retry-data blocks, or both, in the list set.

Target Maximum-Entry Count (TMEC): An integer that specifies the target for the maximum number of possible list entries in a list set.

Target Structure Size (TSS): An integer that specifies the target number of SES storage units to be allocated.

Marginal Structure Size (MRSS): An integer that specifies the minimum number of units of SES storage that can be allocated for the list structure, independent of the requested ratio.

Minimum Apportionable Structure Size (MASS): An integer that specifies the minimum number of units of SES storage that can be allocated for the list structure and substantially satisfy the requested ratio.

Pending Entry-to-Element Ratio (PETELR): A field that contains the last requested target entry-to-element ratio on an allocate list structure command.

Reapportionment-in-Progress Indicator (REIPI): A value that indicates whether a reapportionment process is currently active for the list structure.

Structure-Size-Change Indicator (SSCI): A value that indicates whether an expansion or a contraction process is currently active for the list structure.

The value of the target structure size is rounded up to the nearest multiple of a storage segment size before placing it in the TSS object. The SES storage-segment size is a power-of-two multiple of 4096 bytes, the SES storage-unit size.

Status conditions are also provided as required and as described in further detail below, with regard to completing a cache-allocation process and completing a list-allocation process. An example of a status condition is Allocation Incomplete which signifies that the structure has not completed the initial-allocation process.

Command quiescing, which is defined as the orderly completion of a particular command execution by the action of forward completion of object references with subsequent discarding of the message response or by backing out such references, is model-dependent for background processes initiated by a command such as allocate cache structure or allocate list structure.

The command quiescing function is disclosed in the aforementioned U.S. Pat. No. 5,339,405 issued Aug. 16, 1994 for "Command Quiesce Function", incorporated herein by reference.

Because the SES facility may contain more than one message processor, potentially simultaneously executing different commands affecting the same or different SES objects (FIG. 2), rules are established within the SES to synchronize execution of these commands in a manner that ensures that the overlapping of the command execution within the SES is not visible to the processes executing with the CPC's (FIG. 2 at 1OB, 1OB, 1OC, 1ON) and accessing SES cache objects (45, 48) and/or list objects (46, 47).

Storage objects at the SES facility are referenced during the execution of SES facility commands. An object reference is the fetching or storing of an explicit value in the object. During the execution of the command, all or some of the objects for that command may be fetched, intermediate results may be maintained for subsequent modification, and final results may be temporarily held prior to placing them in the objects.

The object references of one command occur after those of all preceding commands and before those of subsequent commands, as observed at the subchannel. All object references by the message command are completed, as observed by other message commands, before either (1) status is withdrawn at the subchannel, or (2) the subchannel status is made available to any CPU (i.e., the commands are ordered as observed at the subchannel). Object references are of three types: fetches, stores and updates.

When an object participates in the command execution only as a source, the object is a fetch-type object, and the reference to the object is a fetch reference. A fetch-type object is identified in individual command definitions by indicating that the access is for fetching.

When an object participates in the command execution only as a destination, to the extent of being replaced by a new value, the object is a store-type object, and the reference to the object is a store reference.

In some commands, the object participates both as a source and a destination. In these cases, the reference to the object consists first in a fetch and subsequently in a store. This object is an update-type object, and the combination of the two accesses is an "update reference". The update reference is interlocked against accesses by other commands. The fetch and store accesses associated with an interlocked-update reference do not necessarily occur immediately after one another, but all fetch and store accesses associated with references for other commands are prevented from occurring at the same object between the fetch and the store accesses of an update reference. Within the limitations of the above requirements, the fetch and store accesses associated with an update reference follow the same rules as the fetches and stores described in the previous sections.

For object references, the accesses to all bytes within an object are specified to appear to be concurrent as observed by all CPUs. With a fetch-type reference, no store access to the object for another command is permitted during the time that bytes contained in the object are being fetched. With store-type references, no access to the object, either fetch or store, is permitted for another command during the time that the bytes within the object are being stored. Locks within the SES are used to enforce these object-concurrent reference rules, and are described in further detail below.

A command or a checkpoint of an allocation process may reference several objects concurrently. The references to the objects must appear to be concurrent as observed by all message commands. No store accesses for another command or a checkpoint of an allocation process are permitted to any of the objects during the time that bytes within any of the objects are being fetched or stored. No fetch accesses are permitted by another command or a checkpoint of an allocation process to any store-type object during the time when bytes within any of the store-type objects are being stored.

The set of objects referenced by a checkpoint of a cache allocation process are specified in the allocate-cache-structure command. The set of objects referenced by a checkpoint of a list allocation process are specified in the allocate-list-structure command.

The objects are arranged according to an object hierarchy. The static SES controls are first, followed by the dynamic SES controls and the retry table. The retry-table entries are further ordered by the retry index. For an SES facility with multiple engines accessing a common object-storage area, the command concurrency requirements can be met by obtaining an internal lock on each object before it is referenced, and holding all of the locks until the command is suppressed or completed. Share locks are obtained for fetch-type objects and exclusive locks are obtained for store-type objects and update-type objects.

Within the limitations of the above requirements, the fetch and store accesses associated with an update reference follow the same rules as the fetches and stores described in the previous sections.

Cache-Structure Requests are made through cache-structure operands. There are a plurality of cache-structure request operands including an "Allocation Type (AT)", an "Apportionment-Priority Indicator (API)", a "Data-Area-Element Characteristic (DAEX)", a "Data-Toleration Factor (DTF)", a "Directory-Toleration Factor (DITF)", Target Directory-to-Data Ratio (TDTDR) and "Target Structure Size (TSS)". The cache-structure request parameters are included in the allocate cache structure command.

An "Allocation Type (AT)" is a value that indicates what action an allocate command should take, and contains the structure-size indicator (SSI), user-structure-control indicator (USCI), and ratio indicator (RI). A plurality of actions may be requested to include: initiating or continuing reapportionment; initiating or continuing reapportionment and updating the USC (user-structure-control); initiating or continuing expansion or contraction; initiating or continuing expansion or contraction and updating the USC; initiating or continuing expansion or contraction and initiating or continuing reapportionment; initiating or continuing expansion or contraction, initiating or continuing reapportionment, and updating the USC; stopping the previous allocation process; and updating only the USC. The structure authority (SAU) is always compared with the comparative structure authority request operand and, when they match, it is replaced with the structure authority request operand. The allocation type is ignored unless the initial-allocation process is complete.

An Apportionment-Priority Indicator (API) is a value that directs the resolution of conflicts in the establishment of an accurate ratio in an expansion or contraction process or when the cache is initially allocated. A "one" value of the API indicates that maintaining an accurate ratio is of higher priority than maximizing the amount of storage resources that are assigned to the structure. A "zero" value indicates that maximizing storage resources is of higher priority and a less accurate ratio will be tolerated.

A Data-Area-Element Characteristic (DAEX) is an integer that specifies the number of bytes in each data-area element.

A data-toleration factor (DTF) is a value that specifies the minimum-number of data-area elements that must be available after any checkpoint of a contraction or reapportionment process as a percentage of the total number of changed data-area elements.

A directory-toleration factor (DTF) is a value that specifies the minimum number of directory entries that must be available after any checkpoint of a contraction or reapportionment process as a percentage of the total number of changed directory elements.

A Target Directory-to-Data Ratio (TDTDR) is a field consisting of two integers that specify the target for the relative number of directory entries to data-area elements possible in the cache. The integer specified in the first byte divided by the sum of the two numbers represents the fraction of the total count of directory entries and data-area elements that consists of directory entries. The integer specified in the second byte divided by the sum of the two numbers represents the fraction of the total count of directory entries and data-area elements that consists of data-area elements.

The value of the first field must be nonzero. The value of the second field divided by the value of the first field must not exceed the maximum data-area size. When the second field is zero and the cache structure is being created, no data-area elements are created and the cache structure is considered to be a directory-only cache.

A Target Structure Size (TSS) operand is an integer that specifies the target number of SES storage units to be allocated.

Cache-structure processes may be invoked by the SES cache-structure commands and include, for example, allocating a cache structure, creating a cache structure, updating the Target-Structure-Size object, updating a Target-Count object, checkpointing a Cache-Allocation process and completing a Cache-Allocation process. The set of processes invoked by a command are listed in the command description.

To allocate a cache structure, a cache structure is created on the first successful invocation of the allocate-cache-structure command for a structure that does not already exist. A cache structure is initially allocated, expanded, contracted, or reapportioned after one or more successful invocations of the allocate-cache-structure command. These operations are referred to generically as "cache-allocation processes". Expansion, contraction, and reapportionment are initiated subsequent to the completion of the initial-allocation process.

Turning to creation of a cache structure, when the cache structure is created the target directory-to-data ratio (TDTDR) and the adjunct-assignment indicator (AAI) determine the attributes of the created structure. When the second field of the TDTDR is zero, no data area elements or adjunct area elements are created and the cache is a directory-only cache.

When the second field of the TDTDR is nonzero and the AAI is on, an adjunct area is assigned to the directory entry. When the second field of the TDDR is nonzero and the AAI is off, no adjunct areas are created.

When a cache-structure is created, (1) the created bit in the structure-identifier vector associated with the structure identifier (SID) value is set, and (2) the cache-structure controls are initialized. This initialization operation includes initializing the LCID vector to zero; placing the structure authority (SAU) operand in the structure authority; placing the USC operand in the user structure control; setting the AAI equal to the value of the AAI operand; placing the MCC operand in the maximum castout-class object; placing the MSC operand in the maximum storage-class object; placing the DAEX operand in the data-area-element-characteristic object; placing the MDAS operand in the maximum data-area-size object; updating the target-structure-size object and the target-count objects; updating the structure-size, maximum-structure-size, and marginal-structure-size objects; and updating the free-space and free-control-space objects.

Further, when a cache structure is created, the maximum-structure-size object is initialized to the smaller of (1) the largest storage size that the model can support, and (2) the maximum-structure-size request operand rounded up to the nearest integral multiple of the SES segment size.

When a cache structure is created but not completely allocated, all cache-structure commands issued to the structure except for the allocate-cache-structure, deallocate-cache-structure, and read-cachestructure-information commands are suppressed or terminated with an initial-allocation-incomplete status condition.

To update the TSS object, when a cache structure is created, the TSS object is set equal to the smaller of 1) the maximum-structure-size object, and (2) the TSS request operand rounded up to the nearest integral multiple of the SES segment size.

When the TSS request operand is within the range specified by the marginal and maximum structure sizes, and an expansion or contraction request is successful, the TSS object is set to the TSS request operand rounded up to the nearest integral multiple of the SES segment size.

When a reapportionment request is initiated without a corresponding expansion or contraction request and the structure-size=change indicator is zero, the target-structure-size object is replaced by the structure-size object value prior to updating the target-count objects. When a reapportionment request is initiated without a corresponding expansion or contraction request and the structure-size-change indicator is one, the TSS object is not changed. In this case, the expansion or contraction process continues, but the new directory-to-data ratio takes effect. The two allocation processes are merged.

When the TSS request operand is larger than the maximum-structure-size object and an expansion request is successful, the TSS object is set equal to the maximum-structure-size object.

When the TSS request operand is smaller than the marginal-structure-size object and a contraction request is successful, the TSS object is set equal to the marginal-structure-size object.

To update the target-count objects, when a creation or a reapportionment request is successful, the target counts are updated such that the ratio of the target directory-entry count to the target data-area-element count is substantially equal to the ratio as specified by the TDTDR request operand, the inverse ratio is smaller than or equal to the maximum data-area size, and the target counts are the largest counts possible given the TSS.

When a creation request is successful, but the target structure size is smaller than the minimum apportionable structure size, the ratio of the new target counts are the best possible, but may vary significantly from the pending directory-to-data ratio.

When an expansion or contraction request is successful, the target counts are updated such that the ratio of the new target directory-entry count to the target data-area-element count is substantially equal to the pending directory-to-data ratio, the inverse ratio is smaller than or equal to the maximum data-area size, and the target counts are the largest counts possible given the TSS.

When the previous cache-allocation process is stopped, as specified by the allocation types, the SS, the TDEC, and the TDAEC contain their values at the most recent checkpoint. Any storage in the process of being purged is restored to use consistent with its use at the most recent checkpoint.

Conflicts may arise in the assignment of the target-structure-size and target-count values. For example, assigning the largest storage size available may create ratios that are not substantially accurate or may create objects that may not be assignable in totality. Conversely, assigning a lesser amount of storage in order to optimally satisfy the ratio may create a structure that is too small to be effectively utilized. Such conflicts may arise from a shortage of control space from the specification of either a large ratio or a ratio with large, relatively prime components from contracting a structure below the MASS, from the types of underlying data structure supporting the requested objects, from inherent constraints in the storage-management algorithms, or from a combination of one or more of these factors. When such conflicts exist and the apportionment-priority indicator is B'0', the target structure size is the primary consideration and the target ratio is the secondary consideration. Particularly, the allocation process should continue even though further progress toward the target structure size will result in a ratio of the new total-directory-entry-count object to the new total-data-area-element-count object that falls outside of the range of the ratio of the current total-directory-entry-count object to the current total-data-area-element-count object and the ratio of the target-directory-entry-count object to the target-data-area-element-count object.

When such conflicts exist and the apportionment-priority indicator is B'1', the target ratio is the primary consideration and the target structure size is the secondary consideration. Particularly, the allocation process should complete if further progress toward the target structure size would result in a ratio of the new total-directory-entry-count object to the new total-data-area-element-count object that falls outside of the range of the ratio of the current total-directory-entry-count object to the current total-data-area-element-count object and the ratio of the target-directory-entry-count object to the target-data-area-element-count object.

In either case, the target count objects should be as large as possible given the target ratio and the target structure size.

Specified toleration levels for data-area elements and directory entries are additional allocation constraints.

A contraction or reapportionment process cannot create a checkpoint when either (1) the new value of the total-data-area-element count at the proposed checkpoint is smaller than the current value and the new value minus the count of changed data-area elements is less than the tolerable-data-area-element count, or (2) the new value of total-directory-entry-count at the proposed checkpoint is smaller than the current value and the new value minus the count of changed directory entries is less than the tolerable-directory-entry count. When either condition occurs, the allocation process is stopped at the previous checkpoint and response code 0 is returned.

The two allocation constraints, the tolerable-data-area-element count and the tolerable-directory-entry count, are enforced only when a contraction or reapportionment request is specified and the corresponding toleration factor is not zero. If either of the toleration factors are zero, the corresponding allocation constraint does not exist. A toleration level may be set for data-area elements but not for directory entries, or likewise for directory entries but not for data-area elements.

The tolerable counts are calculated as follows:

The "tolerable-data-area-element count" is the resultant of the product of the total number of changed data-area elements and the value of the data-toleration-factor operand divided by 100. The resultant is truncated to the nearest integer value.

The "tolerable-directory-entry count" is the resultant of the product of the total number of changed directory entries and the value of the data-toleration-factor operand divided by 100. The resultant is truncated to the nearest integer value.

If both toleration counts are zero, a contraction or reapportionment may continue until the target counts are attained.

"Checkpointing" a cache-allocation process is defined as updating the program-modifiable cache controls so that the new values of the controls are visible to the program. The checkpoint parameters are those reported in the program in response to a Read Cache Information command and include Total Directory Entry Count (TDEC), Total Data Area Element Count (TDAEC), Structure Size (SS), Target Structure Size (TSS), Current Directory Entry Segment Count (DESC), and current Data Segment Count (data SC).

An allocate-cache-structure (ACS) command is always checkpointed when a successful response code is returned. Also, after initial allocation is completed, an allocation process may be checkpointed anytime during the execution of a successful ACS command or when background processing continues as a result of a successful ACS command (the operation of which is described below). Background processing of a successful ACS command stops when a successful response code is returned. As defined in this application, background processing is any function executed by a message processor after the message response has been sent and which may result in the checkpointing of an allocation process, whereas foreground processing is defined as any processing that occurs prior to sending the message response.

When a cache-allocation process is checkpointed, the structure-size, total-directory-entry-count, and total-data-area-element-count cache objects and the free-space and free-control-space global objects are updated. The new structure-size object is within the range of the previous structure-size object and the TSS object. The ratio of the new total-directory-entry-count object to the total-data-area-element-count object is within the range of the ratio of the previous total-directory-entry-count object to the total-data-area-element-count object and the ratio of the target-directory-entry-count object to the target-data-area-element-count object.

The initial-allocation process is complete when (1) commands may be processed against structure objects or (2) a cache structure is not created because there is insufficient storage available to create the marginal structure size.

When a cache structure is not created but the initial allocation is complete, the total-directory-entry-count, total-data-area-element-count, structure-size, and maximum-structure-size response operands are set to zero. Such a condition results when insufficient storage resources exist to create a marginally sized structure. The calculated minimum apportionable structure size and marginal structure size are returned in the response operands.

When a successful response code is returned, all requested cache-allocation processes, as specified in the AT request operand, are complete.

To create directory and data-area elements, the available storage assigned to the cache structure is apportioned, thereby creating directory entries (DE) and data-area elements (DAE). The number of each DEs and DAEs that are created is a function of the amount of available storage, the setting of the AAI, the specified TDTDR, the DAE characteristic (DAEX), and the specified TSS and maximum structure size. The resulting number of DEs and DAEs are placed in the total-directory-entry-count (TDEC) and total-data-area-element-count (TDAEC) control fields, respectively. The storage required for data-area elements and adjunct areas is determined by the DAEX, the AAI, and the TDTDR. Subsequent executions of the allocation process may increase or decrease the TDAEC and the TDEC. However, the DAEX and the AAI are fixed.

There are a plurality of cache-structure commands which are employed by the system to include the allocate-cache-structure command and a read cache-structure information command.

The ACS command updates the user structure control and (1) creates a cache structure or (2) continues or completes initial allocation of a cache structure. Once initial allocation is complete, the ACS command initiates or continues expansion, contraction, reapportionment, or updates the user structure control, or any combination thereof, depending on the allocation-type, as discussed in further detail below.

The ACS command updates the user structure control with the value of the user-structure-control request operand when (1) a cache structure is created or (2) the initial-allocation process is complete, the structure authority (SAU) comparison is successful, and the user-structure-control indicator (USCI) in the allocation-type (AT) request operand is on. SAU generation is done by the program, and is outside the scope of the present invention.

The ACS command creates a cache structure when (1) the specified created bit of the structure-identifier vector is off, (2) the SAU comparison succeeds, (3) the TSS operand is sufficient for creating the associated controls, (4) the TSS operand is less than or equal to the maximum-structure-size (MXSS) operand, and (5) there is sufficient storage available to create a cache structure of the marginal structure size (MRSS).

The ACS command continues the initial allocation of a cache structure when (1) the specified created bit of the structure-identifier vector is on, (2) the SAU comparison is successful, and (3) initial allocation of the structure has not been completed.

The ACS command initiates or continues expansion of a cache structure when (1) initial allocation of the structure has been completed, (2) the SAU comparison is successful, (3) the structure-size (SS) indicator is on, and (4) the specified TSS is greater than or equal to the value of the SS object.

The ACS command initiates or continues contraction of a cache structure when (1) initial allocation of the structure has been completed, (2) the SAU comparison is successful, (3) the SS indicator is on, and (4) the specified TSS is smaller than the value of the SS object.

The ACS command initiates or continues reapportionment of a cache structure when (1) initial allocation of the structure has been completed, (2) the SAU comparison is successful, and (3) the ratio indicator (RI) is on.

The ACS processes are checkpointed and completed at the established checkpoint when (1) initial allocation of the structure has completed, (2) the SAU comparison succeeds, and (3) the AT specifies a stop.

When the requested cache-structure processes are complete, all the processes are checkpointed and the TDEC, TDAEC, MXSS, MASS, MRSS, SS, and a successful response code (RC) are returned in the response operands.

When a model-dependent time period (e.g., several milliseconds) has elapsed before the allocation processes are completed, the processes are checkpointed and the TDEC, TDAEC, MXSS, MASS, MRSS, SS, and a successful RC are returned in the response operands.

When the comparative structure authority request operand and the SAU control do not match, the SAU, the USC, and an indicative RC are returned in the response operands. When the cache structure does not exist and the TSS request operand is (1) insufficient to allow for the creation of the associated controls for the cache structure, or (2) larger than the MXSS request operand, the MASS and the MRSS required to support the request are placed in the MASS and MRSS response operands, respectively. The MASS, MRSS and an indicative RC are returned to the program.

Once the initial allocation is completed, the allocation—incomplete status condition is no longer recognized. More particularly, allocation incomplete is not recognized while expansion, contraction or reapportionment is in progress. Commands for a structure that has been created, but for which a contraction operation is incomplete, are executed normally. More particularly, commands may reference and update objects scheduled for contraction, alluded to above. Contraction is not guaranteed to complete. For example, a contraction cannot complete when the cache is full with changed data.

When a cache structure is contracted, the data areas and directory entries are migrated between storage segments so that storage segments assigned to the cache structure may be released. When migration of changed data requires the reclamation of unchanged data areas or directory entries, the reclaim vector mechanism is not used. Thus, least recently used (LRU) ordering may not be preserved across a contraction operation.

The structure size may include non-program—addressable storage that is required for model-dependent controls. The TSS operand must be large enough to accommodate both the program-addressable and non-program-addressable objects.

When an interface-control-check condition occurs before the response is returned successfully, the program may reissue the command. When the SAU matches the authority specified on the command and the combination of the SI and SAU is unique, the execution of the cache command was completed with a successful RC.

When there is insufficient space in the SES to create a cache structure, a successful RC is returned. The program may determine this condition by examining the structure size that is returned. If the structure size is zero, a cache structure was not created. When the requested structure size is not an integral multiple of the SES segment size, the TSS is rounded up to the nearest integral multiple of the SES segment size. The SES only progresses in contraction to the extent that free or unchanged DAs and DEs exist. When a cache structure is full of changed data and directory entries, no progress can be made by the SES. To facilitate contraction, the castout process, in which data elements and directory entries are cast out as briefly mentioned above, may execute in parallel with the contraction process.

Further, expansion or contraction of a cache structure cannot be initiated until the initial allocation of the cache structure has completed. If ACS is issued while initial allocation is in progress and the AT operand indicates a size change, the AT operand is ignored and the initial allocation is continued. However, if expansion or contraction is in progress and an allocate-cache-structure command is issued and the AT operand indicates a size change, the new value of the TSS operand is honored. Commands that are recognized at the SES facility for a structure that has been created, but for which allocation has not yet been completed, are suppressed with an indicative response and status code such as "allocation incomplete". The deallocate-cache-structure, ACS, and read-cache-structure-information commands are exceptions, and are executed normally.

When specifying a maximum structure size, care should be exercised since storage may be used when a structure is created to build model-dependent controls to support later expansion. When an ACS command is issued for a cache for which no allocation processes are in progress and for which the specified resource sizes match the existing sizes, the command is immediately executed and a successful response code is returned. The only effect on the cache structure is to update the SAU and USC when requested.

As a practical matter, the size of a hash table should be based on the MXSS, thereby to avoid having to rebuild the hash table when the cache structure is subsequently expanded. The implementation of the cache architecture must support concurrent execution of directory-scan processes and allocation processes. Particularly, migration of data areas and directory entries in support of contraction or reapportionment must not interfere with the execution of a read-directory or detach-local-cache command.

Regarding read-cache-structure information, the read-cache-structure-information command returns the values of the cache controls (e.g., both fixed and programmable) for the specified cache structure. The values of the cache controls are placed in the response operands, and the control values along with a successful response code are returned. The TDEC and TDAEC for the SES cache are placed in the TDEC and TDAEC operands, respectively, the AAI is placed in the AAI operand, the maximum storage class is placed in the MSC operand, the maximum castout class is placed in the MCC operand, the data-area-element characteristic is placed in the DAEX operand, the cache structure size is placed in the SS operand, the maximum structure size is placed in the MXSS operand, the minimum apportionable structure size is placed in the MASS operand, the marginal structure size is placed in the MRSS operand, the pending-directory-to-data ratio is placed in the PDTDR operand, the reapportionment in progress indicator is placed in the REIPI operand, the structure size change indicator is placed in the SSCI operand, the user structure control is placed in the USC operand, the structure authority is placed in the SAU operand, the target structure size is placed in the TSS operand, the target directory-entry count is placed in the TGDEC operand, the target data-area-element count is placed in the TGDAEC operand, and the LCID vector is placed in the LCIDV operand.

List-Structure Requests are made through list-structure operands. There are a plurality of list-structure operands including an "Allocation Type (AT)", an "Apportionment-Priority Indicator", an "Element-Toleration Factor (ETF)", "Target Entry-to-Element Ratio (TETELR)", and "Target Structure Size (TSS)". The list-structure request parameters are included in the allocate list structure command.

Allocation Type (AT) is a value that indicates what action an allocate command should take and contains the structure-size indicator (SSI), user-structure-control indicator (USCI), and ratio indicator (Rl). Actions which may be requested include initiating or continuing reapportionment; initiating or continuing reapportionment and updating the USC; initiating or continuing expansion or contraction; initiating or continuing expansion or contraction and updating the USC; initiating or continuing expansion or contraction and initiating or continuing reapportionment; initiating or continuing expansion or contraction, initiating or continuing reapportionment, and updating the USC; stopping the previous allocation process; and updating only the USC.

The structure authority is always compared with the comparative structure authority request operand, and when they match, is replaced with the structure authority request operand upon the occurrence of any allocation function. The allocation type is ignored unless the initial-allocation process is complete.

An Apportionment-Priority Indicator (API) is a value that directs the resolution of conflicts in the establishment of an accurate ratio in an expansion or contraction process or when the list is initially allocated. A "one" value of the API indicates that maintaining an accurate ratio is of higher priority than maximizing the amount of storage resources that are assigned to the structure. A "zero" value indicates that maximizing storage resources is of higher priority and a less accurate ratio will be tolerated.

An element-toleration factor (ELTF) is a value that specifies the minimum number of data-list elements that must be available after any checkpoint of a contraction or reapportionment process as a percentage of the total number of assigned data-list elements.

An entry-toleration factor (ETF) is a value that specifies the minimum number of list entries that must be available after any checkpoint of a contraction or reapportionment process as a percentage of the total number of assigned list entries.

Target Entry-to-Element Ratio (TETELR) is a field consisting of two binary integers that specify the target for the relative number of list entries to list elements possible in the list set. The integer specified in the first field divided by the sum of the two numbers represents the fraction of the total of the maximum list-set-element and the maximum list-set-entry count that consists of list entries. The integer specified in the second field divided by the sum of the two numbers represents the fraction of the total of the maximum list-set-element and the maximum list-set-entry count that consists of list elements associated with data list entries and retry-data blocks.

The operand is valid if both fields are non-zero and if the value obtained when the second field is divided by the first field is smaller than or equal to the maximum data-list-entry size.

Target Structure Size (TSS) is an integer that specifies the target number of storage units allocated.

List-Structure Processes may be invoked by the SES list-structure commands issued by the program, and include allocating, creating, checkpointing and completing a list-allocation process. The set of processes invoked by a command are listed in the command description. To allocate a list structure, the user structure control is conditionally updated on the allocate-list-structure (ALST) command. A list structure is created on the first successful invocation of the ALST command for a structure that does not already exist. A list structure is initially allocated, expanded, contracted or reapportioned after one or more successful invocations of the ALST command. These operations are referred to generically as list-allocation processes. Expansion, contraction, and reapportionment are initiated subsequent to the completion of the initial-allocation process.

When a list-structure is created, the list-structure type determines the attributes of the created structure. The list-structure type has indicators for each of the following: counters, locks, data, adjunct, name, and key, each of which is generally known in the art.

When the count indicator in the list-structure type specified is off and allocation is successful, the list controls for each list contain a list-entry count and a list-entry-count limit. When the count indicator in the list-structure type specified is on and allocation is successful, the list controls for each list contain a list-element count and a list-element-count limit.

When the lock indicator in the list-structure type specified is on and allocation is successful, a lock table is created in list structure 46 described above, with a width specified by the lock-table-entry characteristic and a length as specified by the lock-table-entry count.

When the data indicator in the list-structure type specified is on and allocation is successful, storage is allocated for the creation of list elements. The size of the list elements is specified by the list-element characteristic.

When the adjunct indicator in the list-structure type specified is on and allocation is successful, each list entry created in the structure has an adjunct list entry with a size of 64 bytes. When the name indicator in the list-structure type specified is on and allocation is successful, each list entry created in the structure has a list-entry name associated with it. When the key indicator in the list-structure type specified is on and allocation is successful, each list entry created in the structure has a list-entry key associated with it.

When a list-structure is created, (1) the free-space and free-control-space global controls are updated, (2) the appropriate created bit in the SID vector is set to on, and (3) the list-structure and list controls are initialized, including the update of the TSS and target-count objects. Further, when a list structure is created, the MXSS object is initialized to the value of the MXSS request operand rounded up to the next integral multiple of the SES storage segment size and is limited to the largest storage size that the model can support.

When a list-structure is created but not completely allocated, all list-structure commands issued to the structure except for the ALST, deallocate-list-structure, and read-list-structure-controls commands are suppressed or terminated with an allocation-incomplete status condition.

With regard to updating the TSS Object, when a list-structure is created, the TSS object is set equal to the largest storage size available that 1) supports objects that may be referenced given the TETELR, 2) is equal to or less than the TSS request operand rounded up to the nearest integral multiple of the SES segment size, and 3) is within the range specified by the MXSS and MRSS objects.

When the TSS request operand is within the range specified by the marginal and maximum structure sizes and an expansion or contraction request is successful, the TSS object is set to the TSS request operand rounded up to the nearest integral multiple of the SES segment size.

When a reapportionment request is initiated without a corresponding expansion or contraction request and the structure-size-change indicator is zero, the TSS object is replaced by the SS object value prior to updating the target-count objects. When a reapportionment request is initiated without a corresponding expansion or contraction request and the structure-size-change indicator is one, the TSS object is not changed. In this case, the expansion or contraction process continues, but the new entry-to-element ratio takes effect. The two allocation processes are merged.

When the TSS request operand is larger than the MXSS object and an expansion request is successful, the TSS object is set equal to the MXSS object. When the TSS request operand is smaller than the MRSS object and a contraction request is successful, the TSS object is set equal to the MRSS object.

The target-count objects include the TMELC object and the TMEC object. Updating the target-count objects is performed at various times. For example, when a creation or reapportionment request is successful, the target counts are updated such that the ratio of the TMEC to the TMELC is substantially equal to the ratio as specified by the TETELR request operand, the inverse ratio is greater than zero and smaller than or equal to the maximum data-list-entry size, and the target counts are the largest counts possible given the target structure size.

When an expansion or contraction request is successful, the target counts are updated such that the ratio of the new TMEC to the new TMELC is substantially equal to the Pending Entry-to-Element Ratio (PETELR), the inverse ratio is greater than zero and smaller than or equal to the maximum-data-list-entry size, and the target counts are the largest counts possible given the target structure size.

Conflicts may arise in the assignment of the target-structure-size and target-count values. For example, assigning the largest storage size available may create ratios that are not substantially accurate or may create objects that may not be assignable in totality. Conversely, assigning a lesser amount of storage in order to optimally satisfy the ratio may create a structure that is too small to be effectively utilized. Such conflicts may arise from a shortage of control space, from the specification of either a large ratio or a ratio with large, relatively prime components, from contracting a structure below the MASS, from the types of underlying data structure supporting the requested objects, from inherent constraints in the storage-management algorithms, or from a combination of one or more of these factors.

When such conflicts exist and the apportionment-priority indicator is B'0', the target structure size is the primary consideration and the target ratio is the secondary consideration. Particularly, the allocation process should continue even though further progress toward the target structure size will result in a ratio of the new maximum-list-set-entry-count object to the new maximum-list-set-element-count object that falls outside of the range of the ratio of the current maximum-list-set-entry-count object to the current maximum-list-set-element-count object and the ratio of the target-maximum-entry-count object to the target-maximum-element-count object.

When such conflicts exist and the apportionment-priority indicator is B'1', the target ratio is the primary consideration and the target structure size is the secondary consideration. Particularly, the allocation process should complete if further progress toward the target structure size would result in a ratio of the new maximum-list-set-entry-count object to the new maximum-list-set-element-count object that falls outside of the range of the ratio of the current maximum-list-set-entry-count object to the current maximum-list-set-element-count object and the ratio of the target-maximum-entry-count object to the target-maximum-element-count object.

In either case, the target count objects should be as large as possible given the target ratio and the target structure size.

Specified toleration levels for list elements and list entries are additional allocation constraints.

A contraction or reapportionment process cannot create a checkpoint when either (1) the new value of the maximum-list-set-element count at the proposed checkpoint is smaller than the current value and the new value minus the count of assigned list elements is less than the tolerable-list-element count, or (2) the new value of the maximum-list-set-entry count at the proposed checkpoint is smaller than the current value and the new value minus the count of assigned list entries is less than the tolerable-list-entry count. When either condition occurs, the allocation process is stopped at the previous checkpoint and response code 0 is returned.

The two allocation constraints, the tolerable-list-element count and the tolerable-list-entry count, are enforced only when a contraction or reapportionment request is specified and the corresponding toleration factor is not zero. If either of the toleration factors is zero, the corresponding allocation constraint does not exist. A toleration level may be set for data-list elements but not for list entries, or likewise for list entries but not for data-list elements.

The tolerable counts are calculated as follows:

The "tolerable-list-element count" is the product of the total number of assigned data-list elements and the value of the element-toleration-factor operand divided by 100. The result is truncated to the nearest integer value.

The "tolerable-list-entry count" is the product of the total number of assigned list entries and the value of the element-toleration-factor operand divided by 100. The resultant is truncated to the nearest integer value.

If both toleration counts are zero, a contraction or reapportionment may continue until the marginal structure size is attained.

Checkpointing a List-Allocation Process is defined as updating the program-modifiable list controls so that the new values of the controls are visible to the program. After initial allocation is complete, an ALST command is always checkpointed when a successful response code is returned. Additionally, an allocation process may be checkpointed any time during the execution of a successful ALST command or when background processing continues as a result of a successful ALST command. Background processing of a successful ALST command stops when a successful response code is returned.

When a list-allocation process is checkpointed, the MLSEC, MLSELC, and structure-size list-structure objects and the free-space and free-control-space global objects are updated. The new structure-size object is within the range of the previous structure-size object and the TSS object. The ratio of the new MLSEC object to the new MLSELC object is within the range of the ratio of the previous MLSEC object to the previous MLSELC object and the ratio of the TMEC object to the TMELC object.

The initial-allocation process is complete when 1) commands may be processed against structure objects or (2) a list structure is not created because there is insufficient storage available to create the Marginal Structure Size (MRSS).

When a list structure is not created but the initial allocation is complete, only the MASS and MRSS response operands are non-zero if insufficient storage was available. If the TSS request operand was invalid, then the RC response operand is also non-zero.

There are a plurality of List-Structure Commands available which are used to perform various operations on the list-structure. List-Structure Commands include the allocate-list structure command which updates the user structure control and either 1) creates a list structure, or 2) continues or completes initial allocation of a list structure. Once initial allocation is complete, the allocate-list-structure command initiates or continues expansion, contraction, reapportionment, or updates the user structure control, or any combination thereof, depending on the Allocation-Type request operand.

The user structure control is updated when (1) a list structure is created or (2) the initial-allocation process is complete, the structure authority comparison is successful, and the USCI in the AT request operand is on.

The ALST command creates a list structure when 1) the specified created bit of the structure-identifier vector is off, 2) the SAU comparison succeeds, and 3) the TSS operand is sufficient for creating the requested lock-table entries, lists and associated controls, 4) the TSS operand is less than the MXSS operand, and 5) there is sufficient storage available to create a list structure of a marginal size. The ALST command continues the initial allocation of a list structure when 1) the specified created bit of the structure-identifier vector is on, 2) the SAU comparison is successful, and 3) initial allocation of the structure has not been completed.

The ALST command initiates or continues expansion of a list structure when (1) initial allocation of the structure has been completed, (2) the SAU comparison is successful, (3) the structure-size indicator is on, and (4) the specified TSS is greater than or equal to the value of the structure-size object.

The allocate-list-structure command initiates or continues contraction of a list structure when 1) initial allocation of the structure has been completed, 2) the SAU comparison is successful, 3) the structure-size indicator is on, and 4) the specified TSS is smaller than the value of the structure-size object.

The allocate-list-structure command initiates or continues reapportionment of a list structure when 1) initial allocation of the structure has been completed, 2) the SAU comparison is successful, and 3) the RI is on.

The list-structure processes are checkpointed and completed at the established checkpoint when 1) initial allocation of the structure has been completed, 2) the SAU comparison is successful, and 3) the AT specifies stop.

When the allocation processes are complete, all the allocation processes, are checkpointed and the MASS, MRSS, SS, TMEC, TMELC, MLSEC, MLSELC, MXSS, and a successful RC are returned in the response operands.

When a model-dependent time period (e.g., several milliseconds) has elapsed before the allocation processes are completed, the processes are checkpointed and the MLSEC, MLSELC, MXSS, MASS, MRSS, SS, TMEC, TMELC, and a time-period-elapsed RC are returned in the response operands.

When the comparative structure authority request operand and the SAU control do not match, the SAU, the USC, and an indicative RC are returned in the response operands. When the list structure does not exist and the TSS specified is either 1) insufficient to allow for the creation of the requested lock-table entries, lists, and associated controls, or (2) larger than the MXSS request operand, the MRSS and the MASS required to support the request and an indicative RC are returned to the program.

When a list is allocated with a lock table only, the TSS is allocated even when the storage required to support the lock-table entry size and lock-table-entry count specified may be less. Operations of a lock table are believed to be well-known and hence will not be described herein. Once the initial allocation is completed, the allocation-incomplete status condition is no longer recognized. More particularly, an allocation incomplete status is not recognized while expansion, contraction, or reapportionment is in progress.

Commands for a structure that has been created, but for which a contraction operation is incomplete, are executed normally. More particularly, commands may reference and update objects scheduled for contraction. Contraction is not guaranteed to complete. The existence of assigned list entries may prevent the completion of the contraction process. When a list structure is contracted, the list-entry controls and list entries migrate between storage segments so that storage segments assigned to the list structure may be released.

Structures created for the efficient searching of list entries in a list structure, such as hash tables and B trees as are generally known to those of ordinary skill in the art, need not be adjustable in size when a list structure is expanded or contracted. However, to provide adequate performance, the size of such structures should preferably be based on the value of the maximum-structure-size request operand when the list structure is initially allocated.

When an ALST command is issued for an existing list for which no allocation processes are in progress and for which the specified resource sizes match the existing sizes, the command is immediately executed and a successful response code is returned. The only effect on the list structure is to update the SAU and USC when requested. When list-entry names exist, the size of the hash table should preferably be based on the maximum structure size, thereby avoiding rebuilding the hash table when the list structure is expanded.

The implementation of the list architecture (e.g., list structure 46 in FIG. 4) must support concurrent execution of expansion, contraction or reapportionment and all other list-structure commands. Migration of data and controls in support of contraction or reapportionment should be controlled so as not to interfere with the execution of commands that reference the migrated data and controls, including the multiple-list-entry commands. The structure size preferably includes non-program-addressable storage that is required for model-dependent controls. The TSS operand is preferably large enough to accommodate both the program-addressable and non-program-addressable objects.

When an interface-control-check condition occurs before the response code is returned successfully, the program may reissue the command. When the SAU matches the authority specified on the command and the combination of the SI and SAU is unique, the execution of the first command was completed with a successful RC.

When there is insufficient space in the SES to create a list structure, a successful response code is returned. The program may determine this condition by examining the structure size that is returned. If the structure size is zero, a list structure was not created.

To support the key function, a B-tree, which is known to one of ordinary skill in the art, may be statically allocated. When an entry is created, moved or deleted, overhead may exist to keep the B-tree balanced. Therefore, the keys should not be allocated unless more than one key is used, and significant additional storage may be required to allocate the structure.

When the requested structure size is not an integral multiple of the SES segment size, the structure size is rounded up to the nearest integral multiple of the SES segment size. Care should be taken when specifying a maximum structure size, since storage may be used when a structure is created to build model-dependent controls to support later expansion.

Expansion or contraction of a list structure cannot be initiated until the initial allocation of the list structure has completed. If ALST is issued while initial allocation is in progress, the TSS operand is ignored and the initial allocation is continued. However, if expansion or contraction is in progress and an ALST command is issued, the new value of the TSS operand is honored.

Commands that are recognized at the SES facility for a structure that has been created, but for which allocation has not yet completed, are suppressed with an indicative response and status condition. The deallocate-list-structure, ALST and read-list-structure-controls commands are exceptions and are executed normally. The SES can only progress in contraction to the extent that there is unused storage in the structure. When a list set is full, no progress can be made. To facilitate contraction, the program (i.e., the main program) is responsible for deleting list entries when there is insufficient unused storage to accommodate the contraction request.

Another list-structure command is the read-list-structure-controls command which returns the list-structure controls. The list-structure controls and a successful RC are returned in the response operands.

Figure 5C:
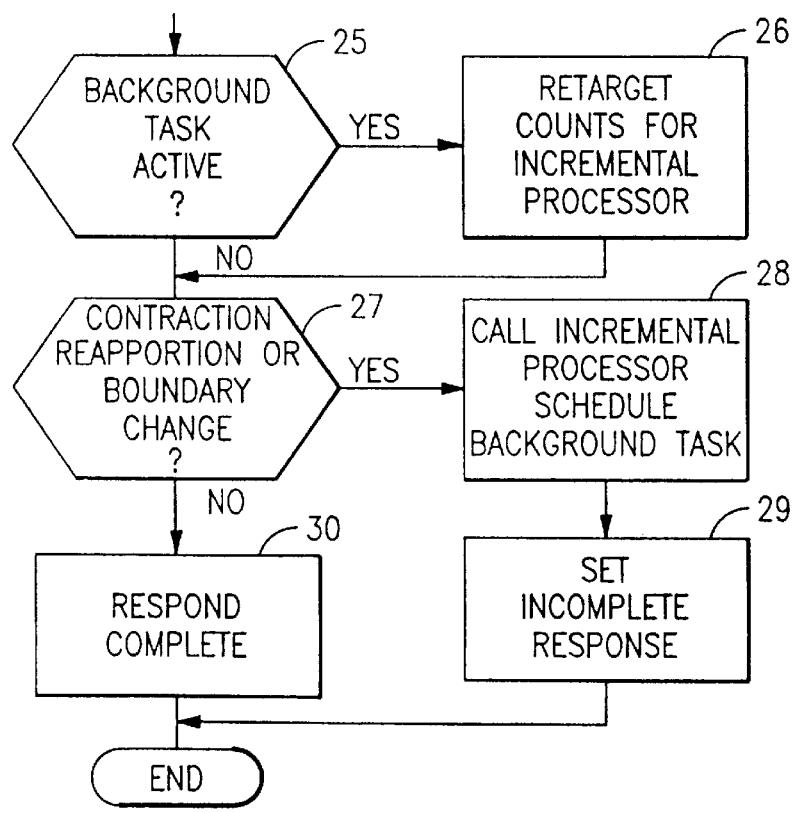
FIGS. 5(a)–5(c) are flowcharts illustrating an expansion, contraction, and reapportionment operation of a cache structure.
Figure 5A:
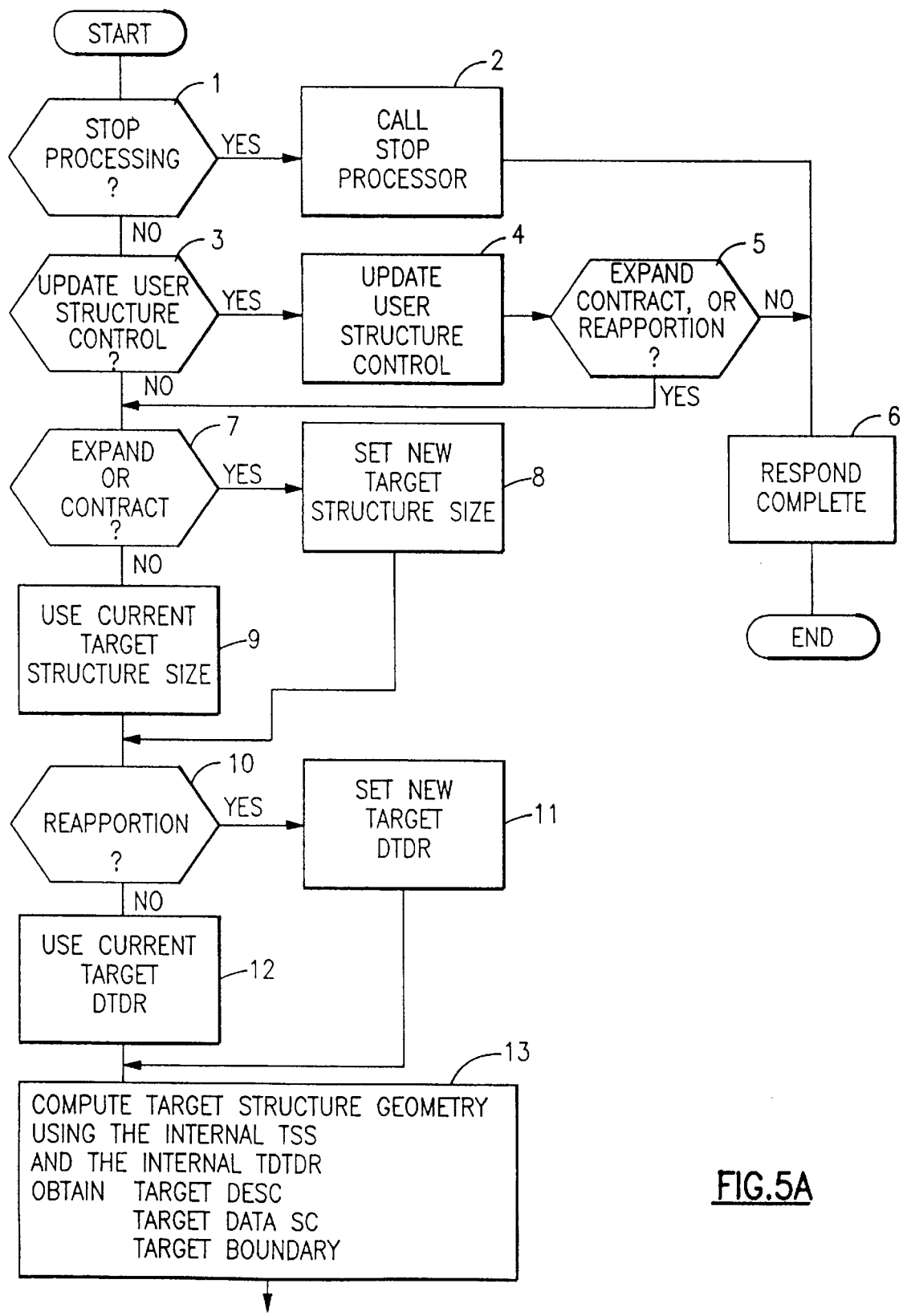

Turning now to the logic flow of the expansion, contraction, and reapportionment of a cache structure according to the invention and referring to FIG. 5(A), in step 1, it is determined whether the allocation type (AT) indicates whether processing has stopped. If the allocation type indicates a "stop" in step 1, then, in step 2, the stop processor or subroutine, is invoked to stop the background task. Generally, the stop processor essentially makes the checkpoint counts the final counts. Further, the stop processor halts any background purging activity. For any partially purged segment, the stop processor removes the purged entries or elements from the purge queue and places them on the appropriate free (e.g., data element or directory entry) list.

Thus, the stop processor updates the checkpoint counts to current values. Then, a task complete indication is returned to the program in step 6.

If a processing stop is not indicated and if the allocation indicates that the user structure control is to be updated in step 3, then this operation (e.g., updating the user structure control) is performed in step 4. In step 5, it is determined whether an expansion, contraction or reapportionment is to be performed. If, in step 5, the allocation control indicates that only updating the user structure control is to be performed (e.g., no expansion, contraction, or reapportionment of the cache structure), then a task completion indication is returned to the program in step 6 and the process ends.

If, in step 5, the allocation type indicates an expansion or contraction, reapportionment or if, in step 3, there is no update of the user structure control, the process continues to step 7 in which it is determined whether the cache is to be expanded or contracted. If the cache is to be expanded or contracted, then a new (e.g., requested) Target Storage Size (TSS) is saved in the TSS operand field, as shown in step 8. If no expansion or contraction is to be performed, the TSS operand is either left unchanged if a size change is in progress, or is set equal to the current SS operand in step 9.

In step 10, it is determined whether a reapportionment is necessary. If the allocation type indicates a reapportionment, then a new (e.g., a requested) Target Directory-to-Data Ratio (TDTDR) is saved in the internal TDTDR field, as shown in step 11. If no reapportionment is to occur, then, in step 12, the internal TDTDR is set equal to the pending DTDR.

In step 13, a Compute Target Structure Geometry subroutine is invoked to compute from a given (internal) structure size and TDTDR, a target DE segment count DESC, a target data segment count DATA SC, a target boundary, a target DE count, and a target data element count.

Figure 5B:
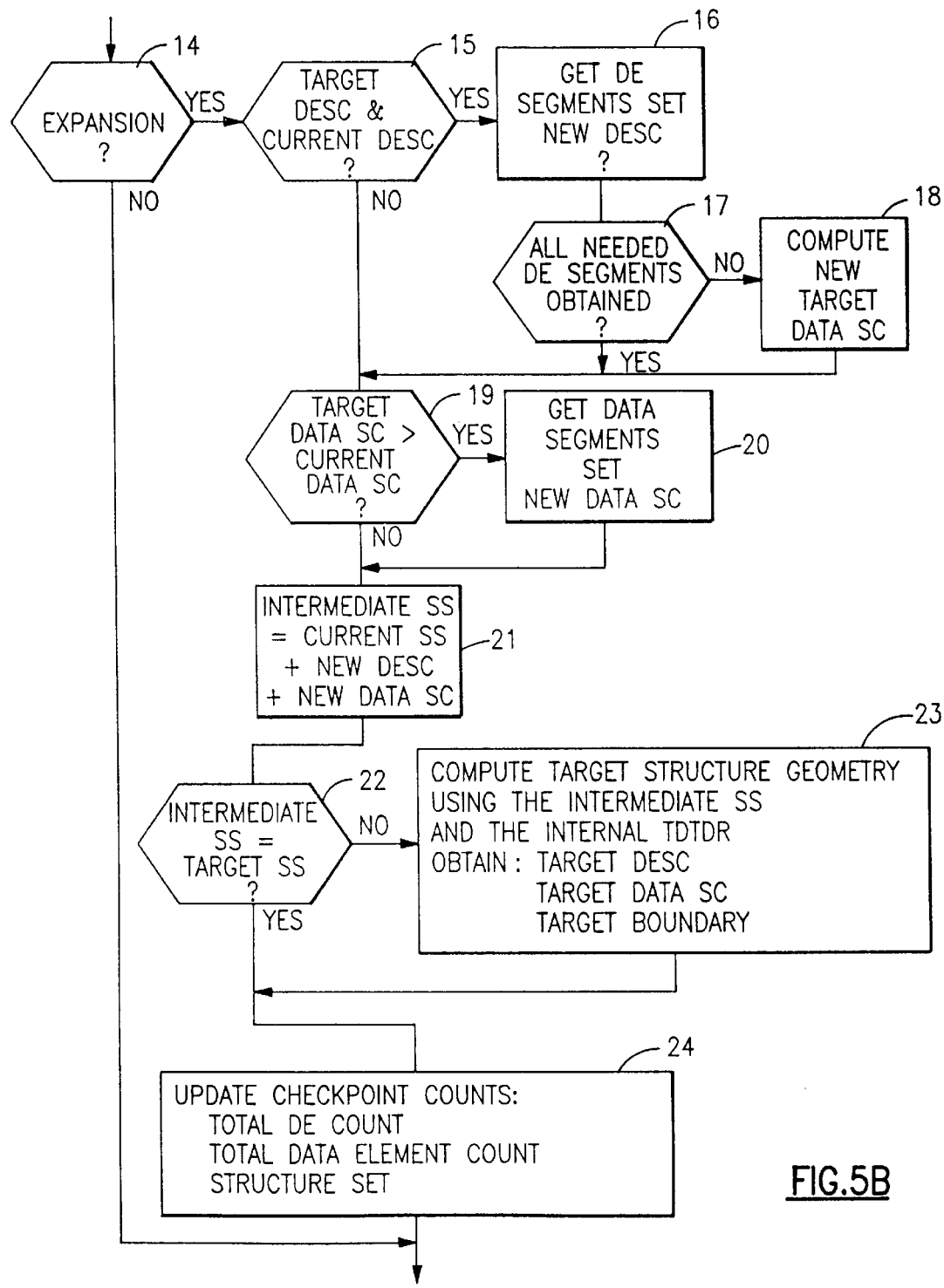

The flow continues to step 14, as shown in FIG. 5B, in which it is determined if an expansion is to be performed. If an expansion is indicated (e.g., the target structure size is greater than the current structure size), in step 15 it is determined whether DE segments are required by determining whether the target DE segment count DESC is greater than the current DE segment count DESC. If it is determined that DE segments are needed, then the count of required new DE segments is requested from the storage manager in step 16. The storage manager is a coupling facility function that coordinates the assignment of storage segments for structure allocation, and operates to manage the storage capacity and make-up of the cache. The count of new DE segments needed is either the difference in the target and current DE segment counts or the difference in the target and current structure sizes, whichever is smaller. If there is both an expansion and a reapportionment, more DE segments will be needed, but fewer data segments may be required. Thus, the count of DE segments needed may actually be more than the total number of storage segments required. When this situation occurs, additional DE segments are obtained when the extra data segments are purged by swapping the purged data segments for DE segments.

The storage manager returns a count of the new DE segments actually obtained in step 16. In step 17, it is determined whether all of the required DE segments were obtained. If not all of the DE segments were obtained (e.g., the number of DE segments is less than that requested), then, in step 18, the count of target data segments is recomputed so that the TDTDR is maintained. The count of the target data segments is recomputed to avoid obtaining more data segments than can actually be used. Thus, no storage is wasted.

If, in step 14, an expansion is indicated (e.g., the target structure size is greater than the current structure size) and data segments are needed (e.g., the target data segment count is greater than the current data segment count as shown in step 19), then the count of new data segments needed is requested from the storage manager in step 20. The count of new data segments needed is either the difference in the target and current data segments counts or the difference in the target and current structure sizes, whichever is smaller. If there is both an expansion and a reapportionment, more data segments will be needed but fewer DE segments may be required. Thus, the count of data segments needed may actually be more than the total number of storage segments needed. When this is the case, additional data segments are obtained when the extra DE segments are purged by swapping the purged DE segments for data segments. The storage manager returns a count of the new data segments actually obtained in step 20.

In step 21, an intermediate structure size is set equal to the sum of the current structure size plus the DESC count of the new DE segments obtained plus the count of the new data segments obtained.

In step 22, it is determined whether the intermediate structure size is larger than the current data structure size SS. If the intermediate structure size SS is less than the TSS, then, in step 23, the Compute Target Structure Geometry subroutine is invoked to compute a new target DE segment count DESC, a new target data segment count DATA SC, a new target boundary, a new target DE count, and a new target data element count, based on the intermediate structure size and the target DTDR.

In step 24, the checkpoint is set equal to the intermediate structure size and is updated by setting the structure size equal to the intermediate structure size, the total DE count equal to the target DE count, the total data element count equal to the target data element count, the current DE segment count equal to the target DE segment count and the current data segment count equal to the target data segment count.

In step 25, as shown in FIG. 5C, it is determined whether the Allocate Cache Structure (ACS) Background Task is active. If so, then the counts for the Incremental Processor (discussed in greater detail below with regard to a list structure) are updated (e.g., retargeted) for the current request. If the ACS Background Task is inactive, then the flow immediately proceeds to step 27, in which it is determined whether there is a contraction, reapportionment or boundary change. If there is background work to do such as a contraction, reapportionment or boundary movement, then the incremental processor is invoked to a time slice of work in step 28. The ACS background task is scheduled to run in background in step 28 and is discussed in greater detail below with regard to FIGS. 6(A)–6(B). A task incomplete indication is returned to the program in step 29. However, if in step 27 it is determined that no background work is needed, then a task complete indication is returned to the program in step 30.

Figure 6A:
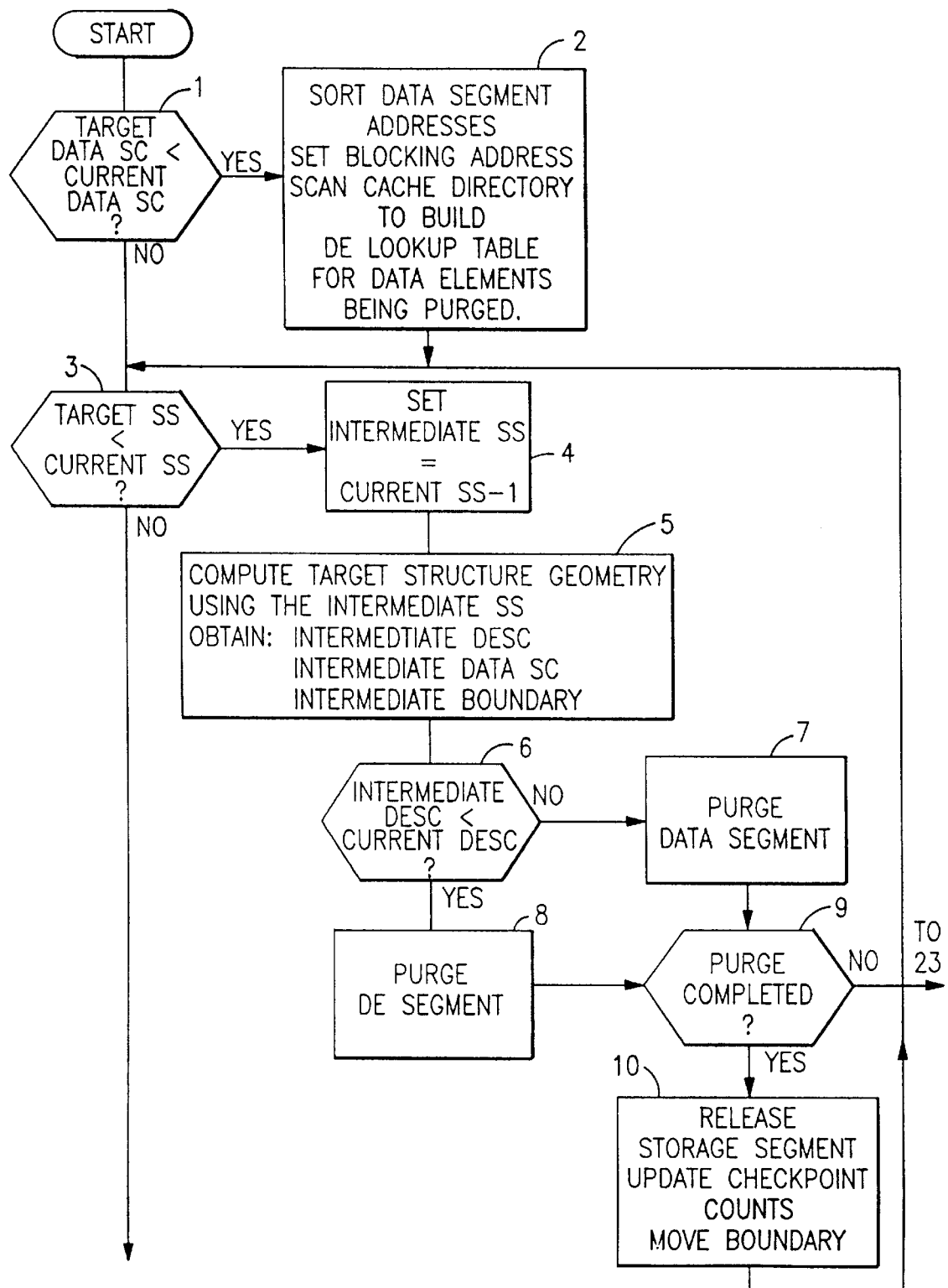
FIGS. 6(a)–6(b) are flowcharts illustrating operations of an allocate-cache structure incremental processor.
Figure 6B:
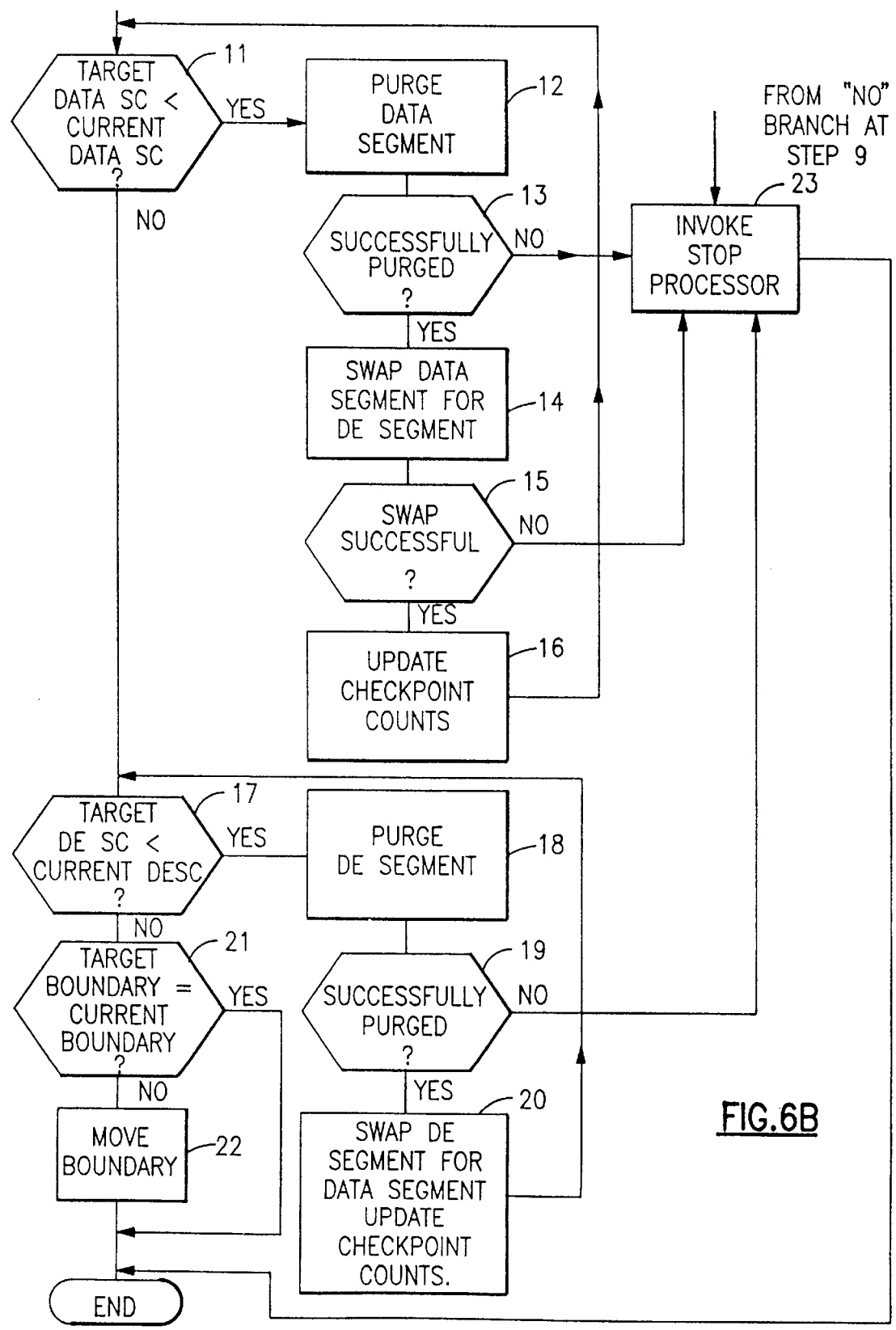

FIGS. 6(A)–6(B) illustrate the operation of the Allocate Cache Structure (ACS) Incremental Processor (the incremental processor for a list model is described below). In step 1 of FIG. 6(A), it is determined whether the target data segment count DATA SC is less than the current data segment count DATA SC. If the target data segment count is less than the current data segment count (e.g., the number of data segments is being contracted), then "n" data segments are to be purged, where "n" is the difference between the target and current data segment counts.

More specifically, in step 2, the data segments addresses are sorted in ascending order. The segments with the "n" lowest addresses are to be purged of their data elements. A blocking address, which is for preventing mainline processing from reusing these purgeable data elements, is set equal to the address of the highest addressed segment being purged (segment "n") plus the segment size minus 1. All data elements whose addresses are less than this blocking address will eventually be purged. A blocking flag is set to allow the mainline code to detect when blocking is in effect.

All purgeable elements are removed from the list of free data elements to prevent them from being used. They are placed on a data element purge queue. The cache directory is scanned to build a directory-entry lookup table. Each location in the lookup table corresponds to a data element to be purged. The contents of that location is a pointer to the directory entry that contains that data element. If no directory entry contains that data element, then the data element is unused and that lookup table location contains zeros.

In step 3, it is determined whether a contraction was requested (e.g., the TSS is less than the current structure size). If so, then an intermediate structure size SS equal to the current structure size SS minus 1, is set in step 4. Hence, the structure size is reduced one segment at a time providing stepwise contractions, until the TSS is reached.

In step 5, the Compute Target Structure Geometry subroutine is invoked to compute an intermediate DE segment count DESC, an intermediate data segment count and an intermediate boundary based on the intermediate structure size and the target DTDR. As a result of this computation, either the intermediate data segment or the intermediate DE segment count will be one less than the respective current segment count. However, only one of these two counts will be less, not both.

Figure 7A:
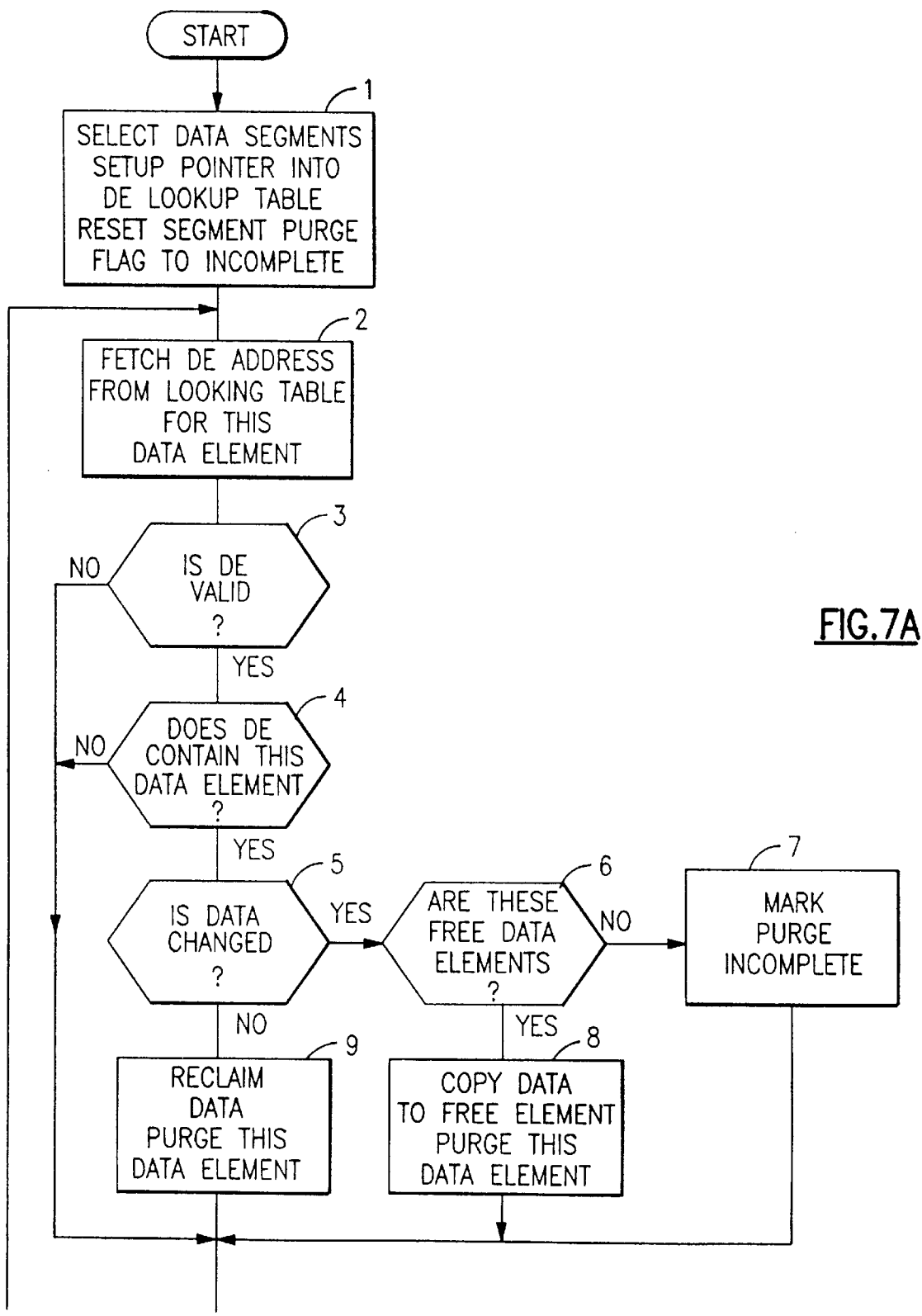
FIGS. 7(a)–7(b), joined as shown in FIG. 7, are flowcharts illustrating a purge data element segment operation.
Figure 7B:
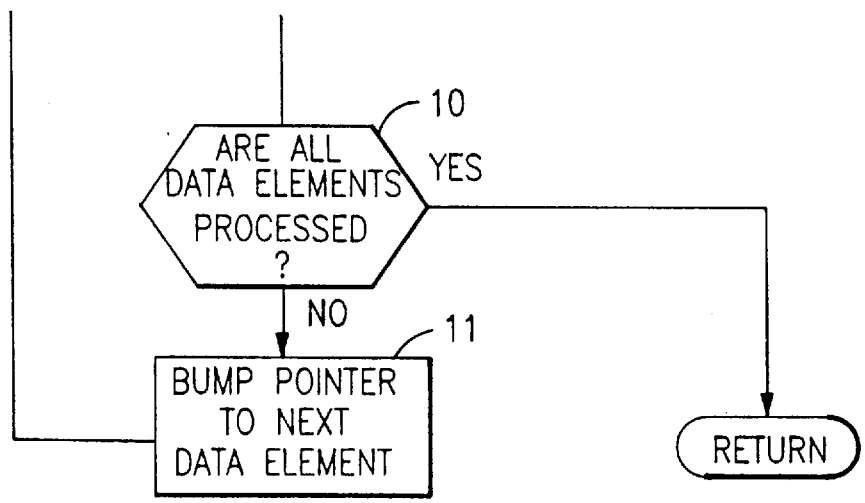

In step 6, it is determined whether the intermediate DE segment count DESC is less than the current DE segment count DESC. If the intermediate DE segment count is less than the current DE segment count, then the Purge DE Segment processor (e.g., subroutine discussed in further detail below with regard to FIG. 8), is invoked in step 8. If the intermediate data segment count is less than the current data segment count, the Purge Data Segment processor (discussed in further detail below with regard to FIGS. 7(a)–7(b)) is invoked in step 7. In step 9, it is determined if the DE or data segment was completely purged. If the DE or data segment was not completely purged, then the targets cannot be achieved. The stop processor is invoked in step 23 to stop the background task. The final size and counts achieved (SS, TDEC, and TDAEC) are those from the previous checkpoint.

If the DE or data segment was completely purged as determined in step 9, then the storage segment is released to the storage manager in step 10 and the checkpoint counts are updated. The checkpoint counts are updated by making equal the structure size to the intermediate structure size, the total DE count to the intermediate DE count, the total data element count to the intermediate data element count, the current DE segment count to the intermediate DE segment count and the current data segment count to the intermediate data segment count. Further, in step 10, the Move Boundary Processor is invoked to move the boundary to its new location, by purging and creating directory entries and data elements in the boundary segment. Thereafter, the process loops back to step 3 to determine if the structure must be contracted some more. The Move Boundary subroutine uses a Boundary segment lookup table similar to the lookup table used for purging data segments. This table is created during structure creation and must be maintained by mainline code. The move boundary routine will purge either directory entries to make way for data elements, or it will purge data elements to make way for directory entries. The purging of directory entries and data elements is similar to what occurs in the Purge DE Segment or Purge Data Element Segment routines.

The process continues to step 11, as shown in FIG. 6B. If a contraction was not requested or if no more contraction is to occur (the TSS must not be less than the current structure size as determined in step 3), then it is determined in step 11 if the current data segments are to be purged for reapportionment (e.g., target data segment<current data segment count). If it is so determined, then in step 12 the Purge Data Segment processor (discussed below) is invoked to purge data segments. In step 13, it is determined whether the segment was purged successfully. If the segment was not purged successfully, then the targets cannot be achieved. The stop processor is invoked in step 23 to stop the background task. The final size and counts achieved (SS, TDEC, and TDAEC) are those from the previous checkpoint. If successfully purged, then in step 14, an attempt is made to swap the purged data segment for a DE segment. In step 15, it is determined if the swap has been successful. If the swap does not succeed, then the reapportionment cannot continue since the needed DE segment cannot be obtained. The stop processor is invoked in step 23 to stop the background task. The final size and counts achieved (SS, TDEC, and TDAEC) are those from the previous checkpoint.

If the swap is successful as determined in step 15, then in step 16 the checkpoint counts are updated. For example, the structure size remains unchanged but the total DE count is made equal to the total DE count plus the count of the DEs in a storage segment. The total data element count is made equal to the total data element count less the count of data elements in a storage segment. The current DE segment count is made equal to the current DE segment plus 1. The current data segment count is made equal to the current data segment count less 1.

After the checkpoint counts have been updated in step 16, the process loops back to step 11 to determine if there are any more data segments which must be purged. If there are no more data segments to be purged as determined in step 11 (e.g., the target data segment count is not less than the current data segment count), then in step 17 it is determined whether DE segments must be purged and specifically, whether the target DE segment count is less than the current DE segment count. If the target DE segment count is less than the current DE segment count, then the Purge DE segment processor is invoked. In step 19, it is determined whether the data segment was successfully purged. If the segment was purged unsuccessfully, then the target counts cannot be achieved. The stop processor is invoked in step 23 to stop the background task. The final size and counts achieved (SS, TDEC, and TDAEC) are those from the previous checkpoint.

If the segment was purged successfully, then the process continues to step 20 in which the purged DE segment is swapped for a data segment. This operation always succeeds. Further, the checkpoint counts are updated. For example, the structure size remains unchanged but the total DE count is made equal to the total DE count less the count of the DEs in a storage segment. The total data element count is made equal to the total data element count plus the count of data elements in a storage segment. The current DE segment count is made equal to the current DE segment less 1. The current data segment count is made equal to the current data segment count plus 1.

Thereafter, the process loops back to step 17 to determine whether any more DE segments must be purged. If there are no more DE segments to purge (e.g., it is determined that the target DE segment count is not less than the current DE segment count), in step 21 it is determined whether the boundary must be moved (e.g., since the target boundary does not equal the current boundary). If the boundary must be moved, the Move Boundary processor is invoked in step 22. If the boundary is not to be moved (e.g., the target boundary equals the current boundary) as determined in step 21, the process is completed.

Figure 7:

FIGS. 7(*a*)–7(*b*) illustrate the purge data element segment operation briefly mentioned above. In step 1 of FIG. 7(*a*), the lowest addressed data segment is selected to be purged. A pointer is set up to address the location in the lookup table of the first data element in that frame. The segment purged flag is reset to the complete state and the process continues to step 2.

In step 2, the Directory Entry (DE) address is fetched from the lookup table for the data element. In step 3, it determined whether the DE is valid. If the address is zero, or the directory entry is not valid (e.g., active) as determined in step 3, then this data element is determined to have already been purged. If the data element has been purged, then the process continues to step 10 to obtain the next data element.

In step 4, it is determined whether the directory entry contains this data element. If the directory entry does not contain this data element, then the process continues to step 10 to get the next data element to purge.

In step 5, it is determined whether the data element is changed. If the data element is changed, then the contents of this data element must be copied to a new location. In step 6, it is determined whether there are any free data elements (e.g., the free data element list is non-empty). If so, then in step 8 a new data element is obtained from the free data element list and the data is copied into its location. The new data element is attached to the directory entry and the current data element is placed on the purge queue.

If it is determined in step 6 that no free data elements exist, then the process continues to step 7 in which the segment purged flag is marked incomplete. Regardless of whether the data elements are free, steps 7 and 8 are followed by step 10 in which it is determined whether all data elements have been processed and whether to proceed to get the next data element to purge. If the data element has not changed as determined in step 5, then this data element can be reclaimed in step 9. The reclamation process will place this data element on the purge queue.

With regard to FIG. 7(*b*), if all data elements in the segment are processed as determined in step 10, the process simply returns. Otherwise, in step 11 the lookup table pointer is bumped to the next data element location in the table and the process loops back to step 2. The process is completed when all data elements have been processed.

Figure 8:
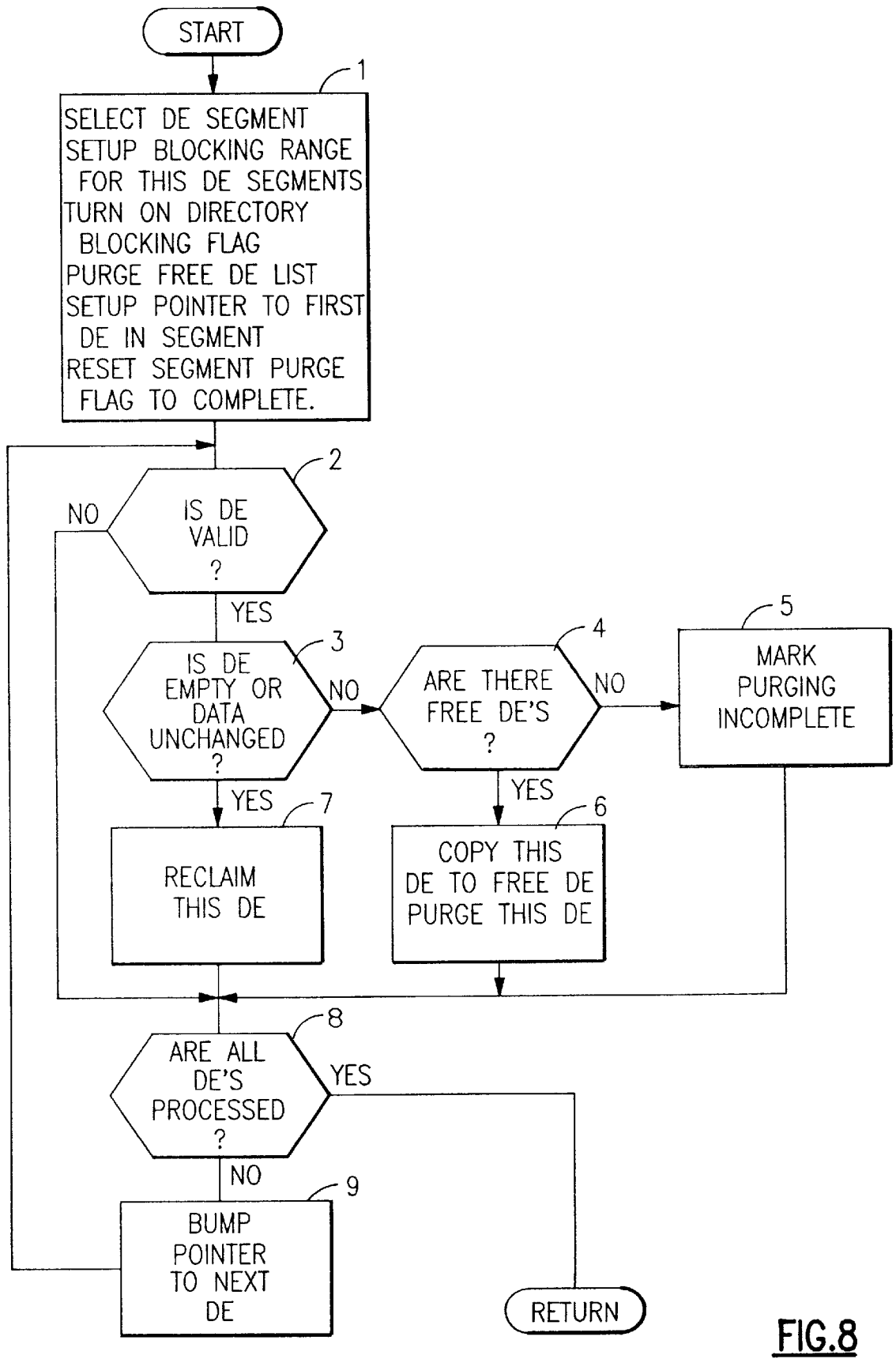
FIG. 8 is a flowchart illustrating a purge directory entry segment operation.

FIG. 8 illustrates the Purge Directory Entry (DE) Segment operation briefly mentioned above. In step 1, the first DE segment on the storage manager's queue is selected to be purged and a blocking range is set equal to the beginning and end of the DE segment. The blocking range is used to prevent mainline processing from reusing these purgeable directory entries. All directory entries whose addresses lie within this range will eventually be purged. A blocking directory flag is set to allow the mainline code to detect when blocking is in effect, as determined in step 1. All purgeable directory entries must be removed from the list of free DEs to prevent them from being used. They are placed on a DE purge queue. A pointer is set to the address of the first DE in the frame. The segment purged flag is reset to the complete state in step 1.

In step 2, it is determined whether this DE is valid. If this DE is not valid (e.g., active), then this data element must have already been purged and the process continues to step 8 to get the next directory element to process. If the DE is valid, then the process continues to step 3 to determine whether the DE is empty (e.g., contains no data) or if its data is unchanged. If the DE is empty or the data is unchanged, then this element can be reclaimed in step 7. The reclamation process in step 7 will place this directory entry on the purge queue. Thereafter, the process continues to step 8 to obtain the next DE to purge.

If, in step 3, it is determined that the DE is not empty or that the data is changed, then the directory entry must be copied to a new DE. Specifically, the process continues to step 4 to determine whether any free directory entries exist. If the free DE list is not empty (i.e., there are free DEs), as determined in step 4, then in step 6 a DE is obtained from the list and the old DE is copied into it. All the queues on which this directory entry reside must be updated so that the forward and back pointers point to the new entry. The new directory entry is placed on the purge queue.

If it is determined in step 4 that no free DE exists, then the process continues to step 5 in which the segment purged flag is marked incomplete. Regardless of whether the DEs are free, steps 5 and 6 are followed by step 8 where it is determined whether all directory entries have been processed. If all directory entries in the segment are processed, the process simply returns. Otherwise, in step 9 the DE pointer is bumped to the next DE in the segment and the process loops back to step 2. Thus, the process is completed when all DEs have been processed.

FIGS. 9(a)–9(b) illustrate a boundary-segment reorganization in which the geometry of the two illustrated boundary segments changes when a list structure initially allocated with a TSS of 3072 segments is expanded by 63 segments (each having 64K bytes) to a new size of 4080. The new boundary-frame geometry is needed to maintain the 1:4 entry-to-element ratio established when the structure was first allocated.

FIGS. 9(a)–9(b), taken together, show that a list structure includes three types of segments including: full segments associated with fixed objects (these segments do not participate in expansion, contraction and/or reorganization activity unless a reapportionment in favor of list entries causes the LEID Table to expand, in which case the number of fixed-object segments increases by one or more full segments); full segments associated with LECs, Nodes, and LELs; and boundary segments. A list structure having no boundary segments may be envisioned. Such a list structure would be unusual in that all of the LECs fit neatly into some number of full segments, all of the Nodes fit neatly into some number of full segments, and all of the LELs fit neatly into some number of full segments. If such a structure were then to be expanded by a single segment, a boundary segment would inevitably appear, since it would be impossible to maintain the existing ratio of LECs to LELs if the new segment were used entirely for LECs, Nodes, or LELs. The role of the boundary segment is that objects of different types occupy the same segment in order to keep the existing LEC-to-LEL ratio intact.

Prior to discussing the logic and processors for a list model, another feature of the invention termed "reserved segments" will be described. A "List-Entry Control Block" (LEC) is an object in control storage that includes the constructed "List-Entry Controls", the Adjunct List Entry (if the structure has them), an array of pointers to the list Elements that constitute the Data List Entry (if the structure has them), and pointers to the List-Entry Control Blocks to the right and left on the list.

A "List Element" (LEL) is an architected object that contains data and that can be 256, 512, 1K, 2K or 4 Kbytes in size. The ratio of LECs to LELs is determined by the Target Entry to Element Ratio, a request operand of the ALST (Allocate-List-Structure) command. When a list structure has Data List Entries, a given List Entry may have from 0 to 255 List Elements (as determined by the Maximum Data List Entry Size (MDLES) request operand of the ALST command and the Data List Entry Size (DLES) request operand of the Write List Entry (WLE) and Write and Move List Entry (WMLE) commands). The MDLES gives the number of LELs that can be assigned to any one LEC. The DLES gives the number of LELs that are assigned to a particular List Entry at the time the List Entry is created or modified. The WLE and WMLE commands are used to create and modify List Entries.

The List Elements associated with a List Entry constitute a Data List Entry.

When a structure is initially allocated, one storage segment is obtained immediately, but all of the remaining segments needed to achieve the Target Structure Size are merely "reserved" and are termed "reserved segments". That is, the Storage Manager sets aside all of the segments required for the SID in question, but supplies only the first segment, which is needed for the List Structure Descriptor.

Thereafter, the segments are obtained one at a time from the Storage Manager, as they are needed to populate the structure with List Headers, Lock-Table Entries, List Entries, List Elements and so forth. Similarly, when a structure that already exists is expanded, the required segments are reserved and then requests are subsequently made to obtain one segment at a time. By producing one segment at a time, the Storage Manager is able to distribute its activity in small "bites" over a relatively large time period. Foreground operations are not made to wait because a processor is tied up satisfying a storage request involving a large number of segments, as in the conventional systems.

Some segments may not have been used when a contraction, reapportionment, or expansion-with-reapportionment request arrives that requires that segments be removed from the structure or exchanged for segments of a different type. When this occurs, an attempt is made to come as close as possible to the TSS and/or TETELR by manipulating reserved segments. Purging of segments occurs, if at all, only after the reserved segments have been processed.

When a list structure is allocated with an ALST request operand that specifies Keys, a Search Tree is provided for each list in the list set. Whenever a List Entry is created, a Key is written in the List-Entry Control Block associated with that List Entry (the Key is a request operand of the WLE and WMLE commands). As Keys come into existence, pointers to the List-Entry Control Blocks that contain them are written in objects called Search-Tree Nodes. Each node has an array of pointers to List-Entry Control Blocks containing Keys. Each Node also has a pointer to a Node on the left and a Node on the right. The Nodes that constitute the Search Tree for a given list are linked together by these pointers such that a given Key can be located in log "n" time when there are "n" distinct Keys found in the List Entries associated with the list (where "log n" means "logarithm of n base 2").

The space required for Search-Tree Nodes is directly proportional to that required for List-Entry Control Blocks. Thus, as a structure expands, more space is needed for both types of object. Conversely, as a structure contracts, space associated with both types of objects is removed from the structure.

Turning to the list-Model expansion/contract/reapportionment (e/c/r) design, such a design includes a First-Level Foreground Reapportionment processor, Second-Level Foreground Reapportionment processors and an Incremental Processor. An expansion/contraction/reapportionment operation is always initiated by the ALST command. However, once a small amount of foreground processing has been completed, the bulk of the activity can be performed in the background, without any further initiative being provided by the program. Small increments of work are performed when no foreground operations are active. Increments of expansion/contraction/reapportionment work will also be performed if the program issues the ALST command. Hence, the incremental processor is not truly a "background processor", since it can be invoked from either the foreground or from the background.

The First-Level Foreground Reapportionment Processor examines the request operands of the ALST command to determine exactly what type of operation has been requested and whether the operation is in fact already in progress. If the requested operation is already in progress, then all that is required is that the incremental processor be invoked. This will provide the operation with a time-slice on the spot. If no operation is currently active, or if the parameters of the expansion, contraction and/or reapportionment have changed (e.g., new TSS or TETELR), then one of the second-level foreground processors must be invoked to initiate or to redirect the expansion, contraction and/or reapportionment activity. The first level foreground processor is little more than a dispatcher that directs the bulk of the work to the appropriate agency. An additional responsibility of the first-level foreground processor is to shut down any expansion, contraction and/or reapportionment activity that is in progress if an ALST command arrives that includes a new TSS or a new TETELR request operand. This enables the second-level foreground processor to start from a static position captured by the most recent checkpoint.

Second-level foreground expansion/contraction/reapportionment processors include a processor for the expansion of a structure containing List Elements (LELs), a processor for the expansion of a structure containing only Adjunct List Entries, a processor for the contraction of a structure containing List Elements (LELs), a processor for the contraction of a structure containing only Adjunct List Entries, a processor for the combined contraction and reapportionment of a structure containing List Elements, a processor for the simple reapportionment of a structure containing List Elements, and a processor for stopping an ongoing expansion/contraction/reapportionment operation.

In the processor for the expansion of a structure containing LELs, the target structure geometry is computed using the TSS. Storage segments needed to achieve the TSS are requested. If all the requested segments are obtained, then the intermediate TSS is set equal to the TSS. Otherwise, the intermediate TSS is set to the SS plus the number of segments obtained * page/segment. The SS is in terms of 4K pages. Thus, if the structure is expanded by one segment, the SS must be increased by the "segment size divided by 4K", and thus the SS is increased by the number of segments times the number of 4K pages in a segment. This is true for the intermediate TSS as well.

When insufficient storage is available to achieve the TSS or if the correct mix of control and data segments are not available, the initiative for the expansion operation is dropped once the boundary segment reorganization, if any, is complete. If the expansion operation is to be resumed thereafter (i.e., so that the SS will be increased from the intermediate TSS to the TSS), the Expand command must be redriven from the foreground.

If boundary-segment reorganization is required, then the incremental processor (described in further detail below) is scheduled in the background to perform the boundary-segment reorganization.

If the TSS was achieved, then the MLSEC, MLSELC and SS objects are updated to reflect the structure size specified by the TSS request operand. If the TSS could not be achieved, then the MLSEC, MLSELC and SS objects are updated to reflect the increase in size that actually occurred. Achieving the target geometry of the boundary segment or segments may take several operations, but the space in the boundary segments is treated as though the target geometry had already been achieved. For example, LECs occupying space that must be evacuated for LELs are moved on the fly by foreground operations if no LELs are available elsewhere.

In the processor for the contraction of a structure containing LELs, the target structure geometry is computed using the TSS. Reserved segments that are currently not in use are returned to achieve the TSS while the mix of segments required to satisfy the PETELR is retained.

If one or more reserved segments was returned, then the structure geometry is computed for the SS that results from the return of the reserved segments. This computation determines the geometry of the boundary segment or segments, and the MLSEC, MLSELC and SS objects are updated to reflect the structure size achieved by returning the reserved segments and reorganizing the boundary segments, even though this reorganization (if needed) has not taken place as described below.

If the TSS was achieved by returning only reserved segments and if boundary segment reorganization is needed, then the incremental processor is scheduled in the background to perform boundary segment reorganization. Achieving the target geometry of the boundary segment or segments may take time (e.g., several operations), but the space in the boundary segments is treated as though the target geometry had already been achieved. For example, LECs occupying space that must be evacuated for LELs are moved on the fly by foreground operations if no LELs are available elsewhere.

If the TSS was not achieved by returning reserved segments, the incremental processor is scheduled in background to perform full-segment purge and boundary-segment reorganization. MLSEC, MLSELC and SS have not been changed unless one or more reserved segments was returned. When the incremental processor has purged a full segment, it will update these objects, recompute the structure geometry, and proceed with the next full-segment purge if the TSS has not yet been achieved. The incremental processor will maintain the initiative for the contraction operation until the TSS has been achieved or until there is no more space for LECs, LELs and Nodes that must be moved from the segments that must be purged. Boundary segment reorganization occurs immediately after the purging of each full segment.

With the processor for reapportionment, the target structure geometry is computed using the TETELR. To achieve the TETELR, first reserved segments are exchanged (e.g., if the new ratio favors LECs over LELs, then LEL segments are exchanged for LEC and Node segments; if the new ratio favors LELs over LECs, then LEC and Node segments are exchanged for LEL segments).

If two or more reserved segments were exchanged, then the structure geometry is computed for the mix that results from the exchange of the reserved segments. This computation determines the geometry of the boundary segment or segments. Further, the MLSEC and MLSELC objects are updated to reflect the number of LECs and LELs available in the existing mix of segments.

If the TETELR was achieved by exchanging reserved segments, then it is determined whether boundary-segment reorganization is needed. If it is needed, then the incremental processor is scheduled in the background to perform boundary-segment reorganization. Achieving the target geometry of the boundary segment(s) may take time (e.g., several operations), but the space in the boundary segments is treated as though the target geometry had already been achieved. For example, LECs occupying space that must be evacuated for LELs, are moved on the fly by foreground operations if no LELs are available elsewhere.

If exchanging the reserved segments did not achieve the TETELR, the incremental processor is scheduled in background to perform a full-segment purge. MLSEC, MLSELC and SS remain the same unless reserved segments were exchanged. Thereafter, when the incremental processor has purged a full segment and exchanged it for a segment of the opposite type, it will update these objects, recompute the structure geometry, and proceed with the next full-segment purge if the TETELR has not yet been achieved. The incremental processor will maintain the initiative for the reapportionment operation until the TETELR has been achieved or until there is no more space for LECs, LELs and Nodes that must be moved from the segments that must be purged.

In the processor for expansion-with-reapportionment, the target structure geometry is computed using the TSS and TETELR. Achieving TSS and TETELR is attempted by requesting new storage segments and by exchanging reserved segments (i.e., if the new ratio favors LECs over LELs, LEL segments are exchanged for LEC and Node segments; if the new ratio favors LELs over LECs, then LEC and Node segments are exchanged for LEL segments).

If all requested segments were obtained, then the intermediate TSS is set equal to the TSS. If all requested segments were not obtained, then the intermediate TSS is set equal to the SS plus the number of segments obtained * pages/segment.

When insufficient storage is available to achieve the TSS, or if the correct mix of control and data segments is not available, an attempt is nevertheless made to achieve the TETELR. That is, once all the storage that could be obtained has been added to the structure, a reapportionment operation is initiated to bring the elements of the structure (LECs, Nodes and LELs) into the ratio specified by the TETELR request operand. Initiative for the reapportionment operation is not dropped until the TETELR is achieved, an insufficient-space condition is encountered, a frame-exchange attempt fails, or the ETF and/or ELTF cause the reapportionment to be terminated. If the expansion operation is to be resumed thereafter, (that is, so that the SS will be increased from the intermediate TSS to the TSS that was originally specified), then the command must be redriven from the foreground.

If boundary-segment reorganization is needed or if purging of full segments is needed to make further exchanges of segments possible, then the incremental processor is scheduled in the background to perform the boundary-segment reorganization, or purging and exchanging of full segments.

If the TSS and TETELR were achieved, then the MLSEC, MLSELC and SS are updated to reflect structure size at TSS and the ratio of LECs to LELs at TETELR. Then, RC=0 is returned.

If the TSS and TETELR were not achieved, then the SS is updated to reflect structure size at the intermediate TSS and the MLSEC and MLSELC are updated to reflect the number of LECs and LELs available in the existing mix of segments. Further checkpoints will occur as the incremental processor purges and exchanges segments. When a segment has been purged and exchanged for a segment of the opposite type (e.g., LECs for LELs), the incremental processor will update the SS, MLSEC and MLSELC objects, recompute the structure geometry, and proceed with the next full-segment purge if the TETELR has not yet been achieved. The incremental processor will maintain the initiative for this operation until the TETELR has been achieved or until there is no more space for the LECs, LELs and Nodes that must be moved from segments that must be purged.

A reapportionment involves a change in the ratio of LECs to LELs. Assuming a current ratio of 5-to-1 (i.e., five LEC segments to one LEL segment) and that a new ratio of 1-to-5 is desired, the new ratio requires one segment of LECs and five segments of LELs. To achieve this new ratio, four segments of LECs must be purged and exchanged for data segments which can then be filled with LELs. This gives the desired five segments of LELs and leaves the desired one segment of LECs. More complicated scenarios exist which involve Node segments.

Achieving the target geometry of the boundary segment(s) may take several operations, but, following each full-segment purge, the space in the boundary segments is treated as though the target boundary-segment geometry has already been achieved. For example, LECs occupying space that must be evacuated for LELs, are moved on the fly by foreground operations if no LELs are available elsewhere. In the processor for contraction-with-reapportionment, the target structure geometry is computed using the TSS and TETELR. Achieving TSS and TETELR is attempted by returning whatever reserved segments have not been used and by exchanging reserved segments (i.e., if the new ratio favors LECs over LELs, then LEL segments are exchanged for LEC and Node segments; if the new ratio favors LELs over LECs, then LEC and Node segments are exchanged for LEL segments).

If one or more reserved segments are returned and/or two or more reserved segments are exchanged, then the structure geometry is computed for the SS resulting from the return and/or exchange of reserved segments. This computation determines the geometry of the boundary segment(s). The MLSEC, MLSELC and SS objects are updated to reflect the structure size achieved by returning and/or exchanging the reserved segments.

If the TSS and TETELR were achieved by returning and/or exchanging only reserved segments and if boundary-segment reorganization is needed, then the incremental processor is scheduled in background to perform boundary-segment reorganization. Achieving the target geometry of the boundary segment or segments may take time (e.g., several operations), but the space in the boundary segments is treated as though the target geometry had already been achieved. For example, LECs occupying space that must be evacuated for LELs are moved on the fly by foreground operations if no LELs are available elsewhere.

If manipulating the reserved segments did not achieve the TSS and the TETELR, the incremental processor is scheduled in background to perform full-segment purge and boundary-segment reorganization. MLSEC, MLSELC and SS are not changed unless one or more reserved segments were returned. Thereafter, when the incremental processor has purged a full segment, it will update these objects, recompute the structure geometry, and proceed with the next full-segment purge if the TSS has not yet been achieved. The incremental processor will maintain the initiative for the contraction-with-reapportionment operation until the TSS has been achieved or until there is no more space for LECs, LELs and Nodes that must be moved from segments that must be purged.

For the processor for expansion with adjunct only, the target structure geometry is computed using TSS (there are no LELs, but if there are Nodes, then the boundary-segment geometry will vary as the structure size changes). Thereafter, storage segments needed to achieve the TSS are requested. If all requested segments were obtained (i.e., TSS was achieved), then no action is necessary. Otherwise, the intermediate TSS is set equal to the SS plus the number of segments obtained * page/segment. Thereafter the target structure geometry is recomputed using the intermediate TSS.

When insufficient storage is available to achieve the TSS, the initiative for the expansion operation is dropped once the boundary-segment reorganization, if any, is complete. If the expansion operation is to be resumed thereafter (i.e., so that the SS will be increased from the intermediate TSS to the TSS), the Expand command must be redriven from the foreground. If boundary-segment reorganization is needed, then the incremental processor is scheduled in background to perform the boundary-segment reorganization.

If the TSS was achieved, then the MLSEC and SS objects are updated to reflect structure size specified by the TSS request operand. If the TSS was not achieved, then the SS and the MLSEC objects are updated to reflect the structure size at the intermediate TSS. In either case, the SSCI bit is reset and RC=0 is returned once the additional storage has been obtained from the storage manager.

Achieving the target geometry of the boundary segment (s) may take several operations, but the space in the boundary segments is treated as though the target geometry had already been achieved. For example, LECs occupying space that must be evacuated for Nodes are moved on the fly by foreground operations if no Nodes are available elsewhere.

In the processor for contraction with adjunct only, the target structure geometry is computed using the TSS. Reserved segments which are not currently in use are returned to achieve the TSS. If one or more reserved segments was returned, then the structure geometry is computed for the SS that results from the return of the reserved segments. This computation determines the geometry of the boundary segment or segments. There are no LELs. However, if there are Nodes, then the geometry of the boundary segments will vary as the structure size changes. Thereafter, the MLSEC and SS are updated to reflect the structure size achieved by returning the reserved segments and reorganizing the boundary segments (even though this reorganization, if needed, has not taken place as explained further below).

If the TSS was achieved by returning only reserved segments and if boundary segment reorganization is needed, then the incremental processor is scheduled in background to perform boundary segment reorganization. Achieving the target geometry of the boundary segment(s) may take time (i.e., several operations), but the space in the boundary segments is treated as though the target geometry has already been achieved. For example, LECs occupying space that must be evacuated for Nodes are moved on the fly by foreground operations if no Nodes are available elsewhere.

If the TSS was not achieved by returning reserved segments, the incremental processor is scheduled in the background to perform full-segment purge and boundary-segment reorganization. MLSEC and SS are not changed unless one or more reserved segments were returned. Thereafter, when the incremental processor has purged a full segment, it will update these objects, recompute the structure geometry, and proceed with the next full-segment purge if the TSS has not yet been achieved. The incremental processor maintains the initiative for the contraction operation until the TSS has been achieved or until there is no more space for LECs and Nodes that must be moved from segments to be purged. Boundary-segment reorganization occurs immediately after the purging of each full segment.

For the processor to stop ongoing reapportionment, the SS, MLSEC and MLSELC objects are consistent, and reflect the size and geometry of the structure as it existed at the last (i.e., most recent) checkpoint. Stopping requires that the structure be left in a state consistent with the checkpointed SS, MLSEC, and MLSELC values. If a full-segment LEC purge is in progress, then the purge is stopped and the LEC segment is returned to active duty (i.e., available/free for use).

If a full-segment Node purge is in progress, then the purge is stopped and the Node segment is returned to active duty. If a full-segment LEL purge is in progress, then the purge is stopped and the purged LELs are returned from the purged queue to the LEL free lists. This has the effect of returning the LEL segment to active duty.

If boundary-segment reorganization is in progress, then the boundary-segment reorganization must proceed to completion in order to maintain the structure geometry in the state represented by the last checkpoint. The actual completion of the boundary-segment reorganization is accomplished by scheduling the incremental processor as a background task. However, the boundary-segment reorganization is made to appear as though it had already been completed.

A "boundary-segment directory" allows for foreground operations to perform piecemeal boundary-segment reorganization on the fly, in case the "advertised" entry and element counts (as represented by the last checkpoint) have not yet been achieved by the incremental processor at the time list-entry creation or replacement requires the immediate exploitation of objects in the boundary segments. The reason for the above is that boundary-segment reorganization always occurs after a checkpoint, and always reflects the state represented by the checkpoint.

Another operation, known as "boundary-segment purging", is required when the structure has to be contracted and there are no segments left to purge except for possibly one or two boundary segments. If boundary-segment purging is in progress, then the boundary-segment purging is stopped and the boundary segment being purged is restored to the geometry represented by the last checkpoint. The restoration of the structure geometry represented by the most recent checkpoint is made to appear to complete in a single operation that occurs the instant the expansion/contraction/reapportionment "stop" command is executed by the Coupling Facility.

RC=0 is always returned in response to the expansion/contraction/reapportionment "stop" command, and the REIPI and SSCI bits are always reset to zero immediately, regardless of whether incremental activity is required to complete a boundary-segment-reorganization operation that was in progress at the time the "stop" command arrived at the Coupling Facility.

Looking at the incremental processor for the list-model in greater detail, the incremental processor is invoked directly from the foreground to continue an ongoing expansion/contraction/reapportionment operation (i.e., an operation involving expansion, contraction, reapportionment, expansion-with-reapportionment, or contraction-with-reapportionment). It is also scheduled for background execution whenever a reapportionment operation cannot be completed in the foreground when the command therefor is received by the List-Model ALST code. When the reapportionment operation that the incremental processor is operating on has not been completed by the end of the current time slice, the incremental processor schedules itself for background execution.

The incremental processor has several tasks including: purging LEC, Node and LEL segments; returning these segments to the storage manager, and/or exchanging one type of segment for another to achieve the TSS and/or TETELR. Further, the incremental processor reorganizes the boundary segment(s) to conform to the structure geometry computed for the TSS and the TETELR or for an intermediate target structure size and pending entry-to-element ratio.

The goals, which may be final or intermediate, are initially computed by the second-level foreground processor that is invoked at the time the reapportionment command is initially processed. However, each time a full segment is purged, the incremental processor must recompute the structure geometry and set a new goal, unless the final goal has been achieved.

In an expansion-without-reapportionment operation, the only task of the incremental processor is boundary-segment reorganization. If the structure has Adjunct List Entries only, and if there is no Key support, then this task also disappears. However, reapportionment operations will generally require LECs, LELs and Nodes to be moved from one segment to another. This "purging" occurs one segment at a time and a checkpoint is taken whenever a purged segment is returned to the storage manager or exchanged for a different-type segment.

To keep the entry-to-element ratio consistent with the structure size at the point when a full segment is released in the case of a "simple" contraction (i.e., a contraction which does not include reapportionment), the boundary segment geometry is adjusted to reflect the mix of LECs, LELs and Nodes that it should have to keep SS, MLSEC and MLSELC consistent. The actual reorganization of the boundary segment(s) occurs immediately thereafter. A "boundary-segment directory" allows foreground operations to be performed on the fly, in case the "advertised" entry and element counts have not yet been achieved by the incremental processor at the time list-entry creation or replacement requires the immediate exploitation of objects in the boundary segments.

If the TSS and TETELR have been achieved, then no further action is necessary. If TSS and TETELR have not been achieved and no more operations can be performed (e.g., no further purging is possible due to no more free space for LECs, LELs, and Nodes that have to be removed from segments targeted for purging or the storage segments that are needed cannot all be obtained from the storage manager), then no further action is necessary. Alternatively, the incremental processor is re-enqueued on the background work queue.

As described above, the invention provides an apparatus and method for adding or removing storage resources to/from a SES structure (cache or list) under program control. Redistribution of structure resources occurs once the initiative has been provided by either an operator or the program running on host processor(s) attached to the SES, and is in accordance with program-specified goals, rather than mandated by an internal control unit function. The resources being redistributed are addressable by the attached program and thus the invention provides means and a method for re-distributing structure resources while they are still in use by host programs. The assignment of additional storage or release of storage does not affect the ongoing operations of programs against the objects in the structure which remain in use across the physical storage redistribution. Commands executed against objects in the structure continue to execute concurrently with the dynamic redistribution of structure resources.

Further, the invention provides program-directed dynamic reapportionment of resources between directory and data elements in use by host programs. Directory entry resources are converted to data element resources and vice-versa under program control. With the invention, a SES structure, which consists of data and controls and in which expansion and contraction requests are specified by target counts and target ratios, as opposed to integers in conventional fixed cache allocation systems, that is being expanded or contracted is fully available for command execution. A unique aspect of the storage model for SES structures is the dual relationship of data storage and control storage, and the relative proportions of each. Expansion and contraction features according to the invention maintain these relationships to dynamically optimize storage size and utility.

Decisions to expand/contract/or reapportion the SES structure storage are made by a program external to the SES facility and communicated via the ACS and ALST commands. Pending expansion and contraction operations are maintained without affecting the main program and are dynamically performed for each case (as opposed to in a fixed size). Thus, with the invention, the amount of change is determined by each invocation of the expansion or contraction process.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for use with an external data storage facility coupling together a plurality of data processing systems and having at least one of a cache structure and a list structure for storing a plurality of storage resources, wherein said apparatus manages at least one of said cache structure and said list structure in accordance with allocation parameters during processor cycles, said apparatus comprising:

means for reissuing an allocation command to said at least one of said cache structure and said list structure;

means for assigning allocation parameters to said at least one of said cache structure and said list structure;

means for adjusting one of expanding, contracting, reapportioning, expanding and reapportioning, or contracting and reapportioning of said at least one of said cache structure and said list structure, based on said allocation parameters, as storage resources in said external data storage facility become available and as said processor cycles become available to execute said allocation parameters, wherein until said allocation parameters are achieved, the allocation process remains pending and wherein all commands are accepted by said external data storage facility and processed and wherein relative proportions of data elements and directory entries in said at least one of said cache structure and list structure are maintained by said means for adjusting.

* * * * *